US008190850B1

(12) United States Patent
Davenport et al.

(10) Patent No.: US 8,190,850 B1
(45) Date of Patent: May 29, 2012

(54) VIRTUAL BLOCK MAPPING FOR RELOCATING COMPRESSED AND/OR ENCRYPTED FILE DATA BLOCK BLOCKS

(75) Inventors: William C. Davenport, Burlington, MA (US); Philippe Armangau, Acton, MA (US); Sairam Veeraswamy, South Grafton, MA (US); Jean-Pierre Bono, Westborough, MA (US); Yubing Wang, Holden, MA (US)

(73) Assignee: EMC Corporation, Hopkinton, MA (US)

( * ) Notice: Subject to any disclaimer, the term of this patent is extended or adjusted under 35 U.S.C. 154(b) by 342 days.

(21) Appl. No.: 12/571,007

(22) Filed: Oct. 1, 2009

(51) Int. Cl.
*G06F 12/00* (2006.01)
(52) U.S. Cl. ........................ 711/202; 711/170
(58) Field of Classification Search .................. 711/202, 711/170
See application file for complete search history.

(56) References Cited

U.S. PATENT DOCUMENTS

| | | | | |
|---|---|---|---|---|
| 5,991,862 A * | 11/1999 | Ruane | ............................. | 711/202 |
| 5,999,622 A * | 12/1999 | Yasukawa et al. | ............... | 705/51 |
| 7,293,154 B1 * | 11/2007 | Karr et al. | ...................... | 711/202 |
| 8,041,888 B2 * | 10/2011 | Rajan et al. | .................... | 711/112 |
| 2009/0319772 A1 * | 12/2009 | Singh et al. | .................... | 713/153 |
| 2010/0274772 A1 * | 10/2010 | Samuels | ........................ | 707/693 |

* cited by examiner

*Primary Examiner* — Hashem Farrokh

(74) *Attorney, Agent, or Firm* — Krishnendu Gupta; Joseph D'Angelo

(57) ABSTRACT

This invention is a system and a method for operating a storage server to provide read or write access to a data in a data network using a new architecture. The method of creating virtual block mapping pointer in response to a request by a client of the storage server to de-duplicate the file system data block or to allow compression of one or more file system data blocks into one or more physical data blocks. Further, the method relocates one or more file system data blocks from one part of the file system address space to another by using one or more virtual block mapping pointers that provides the mapping information for the one or more file system data blocks that are being relocated. The virtual block mapping pointer allows relocating of file system data blocks by same number of metadata operations regardless of number of files sharing the block that are being relocated and the state of those blocks (compressed or not).

23 Claims, 17 Drawing Sheets

FILE SYSTEM DATA BLOCK MAPPING POINTER

VIRTUAL BLOCK MAPPING FOR RELOCATING COMPRESSED AND/OR ENCRYPTED FILE DATA BLOCK BLOCKS

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to accessing disk storage in a data storage environment, and more particularly to a system and a method for using Virtual Block Mapping (VBM) pointers to share file system data blocks within a file, compressing multiple data blocks transparently to the File Mapping Structures and relocating these shared file system data blocks when data blocks are shared within a single file, versions of a file, and among otherwise unrelated files.

BACKGROUND OF THE INVENTION

Network data storage is typically provided by an array of disk drives integrated with large semiconductor cache memory. A file server is used to interface the cached disk array to the network. The file server performs mapping of a network files to logical block addresses of storage in the cached disk array and move data between a network clients and the storage in the cached disk array. The file server use a network block services protocol in a configuration process in order to export to the network client logical volumes of the network-attached storage, which become local pseudo-disk instances. See, for example, Jiang et al., Patent Application Publication US 2004/0059822 A1 published Mar. 25, 2004, entitled "Network Block Services for Client Access of Network-Attached Storage in an IP Network," incorporated herein by reference. Network clients typically use a network file system access protocol to access one or more file systems maintained by the file server.

Typically the logical block addresses of storage are subdivided into logical volumes. Each logical volume is mapped to the physical storage using a respective striping and redundancy scheme. The data mover computers typically use the Network File System (NFS) protocol to receive file access commands from clients using the UNIX (Trademark) operating system or the LINUX (Trademark) operating system, and the data mover computers use the Common Internet File System (CIFS) protocol to receive file access commands from clients using the MicroSoft (MS) WINDOWS (Trademark) operating system. The NFS protocol is described in "NFS: Network File System Protocol Specification," Network Working Group, Request for Comments: 1094, Sun Microsystems, Inc., Santa Clara, Calif., March 1989, 27 pages, and in S. Shepler et al., "Network File System (NFS) Version 4 Protocol," Network Working Group, Request for Comments: 3530, The Internet Society, Reston, Va., April 2003, 262 pages. The CIFS protocol is described in Paul J. Leach and Dilip C. Naik, "A Common Internet File System (CIFS/1.0) Protocol," Network Working Group, Internet Engineering Task Force, The Internet Society, Reston, Va., Dec. 19, 1997, 121 pages.

The data mover computers may also be programmed to provide clients with network block services in accordance with the Internet Small Computer Systems Interface (iSCSI) protocol, also known as SCSI over IP. The iSCSI protocol is described in J. Satran et al., "Internet Small Computer Systems Interface (iSCSI)," Network Working Group, Request for Comments: 3720, The Internet Society, Reston, Va., April 2004, 240 pages. The data mover computers use a network block services protocol in a configuration process in order to export to the clients logical volumes of network attached storage, which become local pseudo-disk instances. See, for example, Jiang et al., Patent Application Publication US 2004/0059822 A1 published Mar. 25, 2004, entitled "Network Block Services for Client Access of Network-Attached Storage in an IP Network," incorporated herein by reference.

A storage object such as a virtual disk drive or a raw logical volume can be contained in a file compatible with the UNIX (Trademark) operating system so that the storage object can be exported using the NFS or CIFS protocol and shared among the clients. In this case, the storage object can be replicated and backed up using conventional file replication and backup facilities without disruption of client access to the storage object. See, for example, Liang et al., Patent Application Publication US 2005/0044162 A1 published Feb. 24, 2005, entitled "Multi-Protocol Sharable Virtual Storage Objects," incorporated herein by reference.

The container file can be a sparse file. As data is written to a sparse file, the size of the file can grow up to a pre-specified maximum number of blocks, and the maximum block size can then be extended by moving the end-of-file (eof). The sharing of file system data blocks conserves data storage for storing files in a file server. The sharing of file system data blocks among versions of a file typically occurs when the file server has a file system based snapshot copy facility that periodically creates snapshot copies of certain production files or production file systems. The sharing of file system data blocks within a file and among unrelated files typically occurs when the file server has a file system based data de-duplication facility that eliminates from the data storage any file system data blocks containing duplicative data content. See, for example, Bixby et al., Patent Application Publication US 2005/0065986 A1 published Mar. 24, 2005, entitled "Maintenance of a File Version Set Including Read-Only and Read-Write Snapshot Copies of a Production File," incorporated herein by reference.

Snapshot copies are in widespread use for on-line data backup. If a production file becomes corrupted, then the production file is restored with its most recent snapshot copy that has not been corrupted. A file system based snapshot copy facility is described in Bixby et al. U.S. Patent Application Publication 2005/0065986 published Mar. 24, 2005, incorporated herein by reference. When a snapshot copy is initially created, it includes only a copy of the inode of the production file. Therefore the snapshot copy initially shares all of the data blocks as well as any indirect blocks of the production file. When the production file is modified, new blocks are allocated and linked to the production file inode to save the new data, and the original data blocks are retained and linked to the inode of the snapshot copy. The result is that disk space is saved by only saving the difference between two consecutive versions. Block pointers are marked with a flag indicating whether or not the pointed-to block is owned by the parent inode. A non-owner marking is inherited by all of the block's descendants. The block ownership controls the copying of indirect blocks when writing to the production file, and also controls deallocation and passing of blocks when deleting a snapshot copy.

A file system based data de-duplication facility permits a shared file system data block to be linked to more than one inode or indirect block. For example, data de-duplication is applied to a file when the file is migrated into the file server or when new data is written to the file. The new data is written to newly allocated file system data blocks marked as blocks that have not been de-duplicated, and an attribute of the file is set to indicate that a de-duplication process is in progress. Then the data de-duplication process searches a single-instance data store of de-duplicated blocks for a copy of the data in each data block marked as not yet de-duplicated. If a copy is found, then, in the inode or indirect block of the file, a pointer to the block marked as not yet de-duplicated is replaced with a pointer to the copy in the single instance data store, and a reference counter for the data block in the single-instance data store is incremented. If a copy is not found, then the block of new data is marked as de-duplicated and added to the single instance data store. Once the data de-duplication process has been applied to all of the data blocks of the file, then the attribute of the file is set to indicate that the de-duplication process is finished. Whenever a file is deleted, the reference counter for each data block of the file is decremented. Whenever a reference counter is decremented to zero, the storage of the corresponding data block is de-allocated by putting the data block on a free block list so that the storage of the data block becomes available for allocation for receiving new data.

Block ownership information for a snapshot copy facility is maintained by storing respective reference counts for the file system indirect blocks and file system data blocks in the file system block hierarchy, and by storing respective delegated reference counts for the parent-child block relationships in the file system block hierarchy. For each parent-child block relationship, a comparison of the respective delegated reference count for the parent-child relationship to the reference count for the child block indicates whether or not the child block is either shared among parent blocks or has a single, exclusive parent block. For example, if the respective delegated reference count is equal to the respective reference count, then the child block is not shared, and the parent block is the exclusive parent of the child block. Otherwise, if the respective delegated reference count is not equal to the respective reference count, then the child block is shared among parent blocks. As will be further described below, this method of using delegated reference counts for indicating whether a block is either exclusively owned or shared has the advantage of indicating block ownership in a way that is compatible between the snapshot copy facility and the use of reference counts by the data de-duplication facility, and that avoids the updating of reference counts in the metadata of child blocks when a shared indirect block is duplicated or "split" in order to perform a write to a data block depending from the shared indirect block in the file system block hierarchy.

File system based data de-duplication facility is used in conjunction with snapshot copy facility to scale in context of large number of snap copies. When using data de-duplication facility or snapshot copy facility according to the storage technology described above results in sharing of data blocks by multiple files, a set of version files or within a single file. Sharing of the data blocks greatly reduces the amount of physical storage required to store the file system data by maintaining the delegated reference count scheme of version files. When the file system data blocks are relocated within a section of the file system address space (perhaps for replacement of the underlying storage infrastructure), pointers to blocks belonging to version files are updated during this operation to point to newly allocated replacement blocks. Specifically, the relocation operation must lock access to blocks to prevent their contents from being changed during relocation, and must create and hold additional references on both the blocks being relocated and their replacement blocks to prevent either from being prematurely freed or incorrectly considered non-shared. When one or more file system data blocks share data blocks and point to same data block, metadata of all the shared data blocks need to be updated during file system data block relocation operation. Updating metadata for all shared file system data blocks is an I/O intensive operation as it requires reading the metadata of the data block from the storage and performing the write operation.

Read or write access to files and their snapshot copies in a manner described above are considerably slower especially when the data blocks are being relocated. Additionally the technology described above can not accommodate the compression of shared data blocks.

The storage technology described above, in combination with a continuing increase in disk drive storage density, file server processing power and network bandwidth at decreasing cost, has provided network clients with more than an adequate supply of network storage capacity at affordable prices. Increasing the performance by avoiding I/O involved in updating the metadata of every shared file system data block, reducing the time it takes to read data from the file or write data to the file, reducing the time it takes to relocate file system data blocks and to allow advanced operations like compression, encryption of shared file system data blocks would be advancement in the data storage computer-related arts. This is becoming increasingly important as the amount of information being handled and stored grows geometrically over short time periods and such environments add more file systems and data at a rapid pace.

SUMMARY OF THE INVENTION

To overcome the problems described above and to provide the advantages also described above, the present invention in one embodiment includes a method for operating a storage server in a data network for relocating data blocks of a file, the file including multiple data blocks containing data of the file, and the file further being organized as a hierarchy of file system blocks including inodes, indirect blocks, and data blocks, the file stored in a data storage including a production file having a first data block in the hierarchy of file system blocks, the first data block being a child of the production file inode in the hierarchy of file system blocks. In response to a request by a client of the storage server to de-duplicate the file system data block or to create a snapshot copy of the production file, a virtual block mapping pointer is created that provides a mapping information to a logical block storing data of the file system block of the production file. The file system data block includes a pointer pointing back to the metadata of the virtual block mapping pointer. One or more file system data blocks are relocated from one part of the file system address space to another by using the virtual block mapping pointer providing the mapping information for the one or more file system data blocks. The file system data blocks that are being relocated could contain compressed, encrypted or de-duplicated data.

In another embodiment method steps are carried out for operating a storage server in a data network for read or write access to data of a file, the file including multiple data blocks containing data of the file, and the file further being organized as a hierarchy of file system blocks including inodes, indirect blocks, and data blocks, the file stored in a data storage including a production file having a first data block in the hierarchy of file system blocks, the first data block being a child of the production file inode in the hierarchy of file system blocks. In response to a request by a client of the storage server to de-duplicate the file system data block or to create a snapshot copy of the production file, a first virtual block mapping pointer is created that provides a mapping information to a logical block storing data of the file system block of the production file. The file system data block includes a pointer pointing back to the metadata of the first virtual block mapping pointer. One or more file system data block are compressed into one or more physical data block by creating a second virtual block mapping pointer. The second virtual block mapping pointer provides the mapping information to the physical data block storing compressed data of the file system block of the production file. The first virtual block mapping pointer provides the mapping information to the second virtual block mapping pointer, wherein metadata of the physical data block includes a pointer pointing back to the metadata of the second virtual block mapping pointer.

In another embodiment, a system for accessing data in a data storage environment includes program logic to carry out the steps of creating a virtual block mapping pointer in response to a request by a client of the storage server to de-duplicate the file system data block or to create a snapshot copy of the production file. The virtual block mapping pointer provides mapping information to a logical block storing data of the file system block of the production file. The file system data block includes a pointer pointing back to the metadata of the virtual block mapping pointer.

In another embodiment, a program product includes a computer-readable medium having code included on the medium configured to carry out computer-executed steps that are similar or identical to those described above with reference to the embodiment of the method.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

Figure 1:
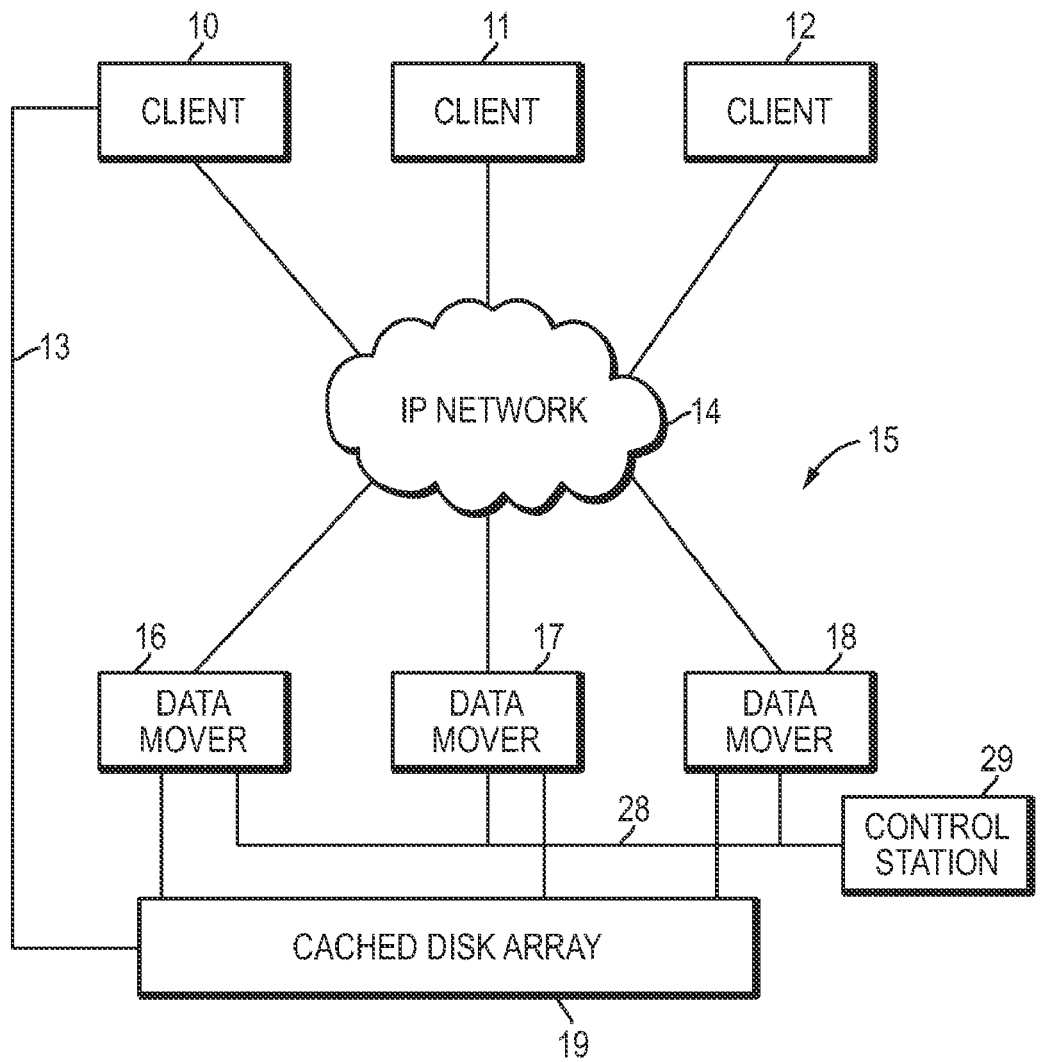
FIG. 1 is a block diagram of a data processing system including a network file server in accordance with the present invention.

The methods and apparatus of the present invention are intended for use in a data storage environment that include data storage systems, such as the Symmetrix Integrated Cache Disk Array system or the Clariion Disk Array system available from EMC Corporation of Hopkinton, Mass. and those provided by vendors other than EMC, and a file server such as Celerra File Server, which is available from EMC Corporation of Hopkinton, Mass.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code (software-based logic) for carrying out the method is embodied as part of the system described below.

Overview

The embodiment of the present invention increases the performance involved in block lookup, allows advanced operations like compression and relocation of a file system data block that is shared by multiple files, a set of version files or within a single file and reduces the IO bandwidth usage.

Maintenance and use of the block sharing information such as ownership flags or reference counters is a factor limiting the performance of a file system based snapshot copy facility or data duplication facility especially when a given data block needs to be compressed or relocated. It has been discovered that when a file system based snapshot copy facility is used together with a file system based data de-duplication facility, it is possible to use a more compatible method of maintaining and using block sharing information in the snapshot copy facility in order to obtain an increase in performance, allowing capability to compress a data block and to obtain efficient relocation of data blocks. The present invention introduces a new kind of block pointer called virtual block mapping (VBM) pointer that enables a migration or re-organization of the data blocks to be preformed in a non-disruptive fashion that is transparent to the file system manager, because the pointers to the logical data blocks can be changed dynamically without changing the block pointers in the inodes and indirect blocks. In addition, metadata of the data blocks includes the back pointer to the virtual block mapping pointers that permit the logical block pointers in the virtual blocks of metadata to be rapidly located given the corresponding logical block addresses. To support the advanced feature like data compression facility, present invention uses the newly introduced virtual block mapping pointer to store the information of the compressed data block.

The new architecture also allows for quick relocation of a file system data blocks by simply changing the metadata information of the virtual block mapping pointers. As a result of creating new virtual block mapping pointer, regardless of the number of files sharing the blocks that need to be relocated and regardless of the state of those blocks (whether compressed and/or encrypted), present invention allows to relocate the blocks using same number of operations that change the metadata of the blocks. Advantages provided include: (1) sharing of compressed data blocks (2) reduction of overall I/O requirements of a system; (3) relocation of shared file system data block (3) low latency in accessing the file data; and (4) space efficiency and economical use of storage resources.

Architecture

FIG. 1 shows an Internet Protocol (IP) network 14 including a multi-protocol network file server 15 and multiple clients 10, 11, 12 that access the cached disk array 19 for reading or writing data stored on the disks. The network file server 15, for example, has multiple data mover computers 16, 17, 18 for moving data between the IP network 14 and a cached disk array 19. The network file server 15 also has a control station 29 connected via a dedicated dual-redundant data link 28 among the data movers for configuring the data movers and the cached disk array 19.

Further details regarding the network file server 15 are found in Vahalia et al., U.S. Pat. No. 5,893,140, incorporated herein by reference, and Xu et al., U.S. Pat. No. 6,324,581, issued Nov. 27, 2001, incorporated herein by reference. The network file server 15 is managed as a dedicated network appliance, integrated with popular network operating systems in a way, which, other than its superior performance, is transparent to the end user. The clustering of the data movers 16, 17, and 18 as a front end to the cached disk array 19 provides parallelism and scalability. Each of the data movers 16, 17, 18 is a high-end commodity computer, providing the highest performance appropriate for a data mover at the lowest cost. The data mover computers 16, 17, 18 may communicate with the other network devices using standard file access protocols such as the Network File System (NFS) or the Common Internet File System (CIFS) protocols, but the data mover computers do not necessarily employ standard operating systems. For example, the network file server 15 is programmed with a UNIX-based file system that has been adapted for rapid file access and streaming of data between the cached disk array 19 and the data network 14 by any one of the data mover computers 16, 17, 18.

Figure 2:
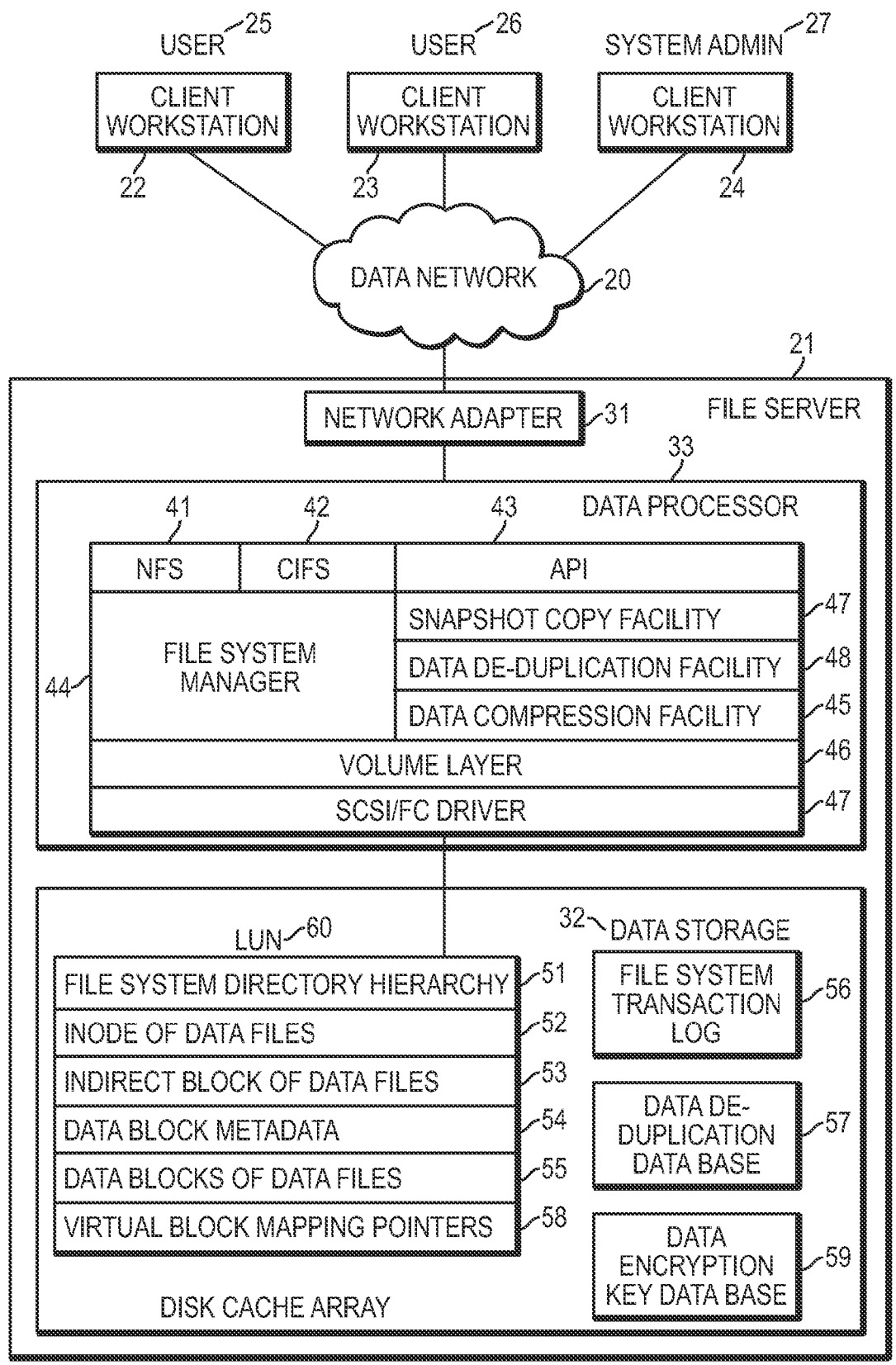
FIG. 2 is a block diagram showing details of a data mover and a cached disk array introduced in FIG. 1.

FIG. 2 shows software modules in the data mover 26 introduced in FIG. 1. it shows a data processing system including a data network 20 linking a network file server 21 to client workstations 22, 23, 24 operated by human users 25, 26, 27. The data network 20, for example, is an Ethernet or Internet Protocol (IP) data network. The user 27 is a system administrator responsible for configuration and maintenance of the data processing system.

The file server 21 includes a network adapter 31 linking the file server to the data network 20. The file server 21 also includes data storage 32 such as one or more disk drives. The file server 21 further includes a data processor 33 coupled to the network adapter 31 and programmed for responding to client requests for access to files in the data storage 32.

The data processor 33 is programmed with a number of program layers, including a Network File System (NFS) module 41, a Common Internet File System (CIFS) module 42, and an application program interface (API) module 43. The NFS module 41 recognizes file access commands received by the network adapter 31 from the client workstations 22, 23, 24 in accordance with the NFS protocol. The CIFS module 42 recognizes file access commands received by the network adapter 31 from the client workstations 22, 23, 24 in accordance with the CIFS protocol. For example, network clients such as UNIX (Trademark) workstations may use the Network File System (NFS) protocol to access files in the data storage 32 of the file server 21, and network clients such as Microsoft Windows (Trademark) workstations may use the Common Internet File System (CIFS) protocol to access files in the data storage 32 of the file server 21.

The application program interface (API) module 43 recognizes additional file access commands which may extend the functionality of the NFS and CIFS protocols. For example, if the NFS module 41 or the CIFS module 42 receives a file access request including an operation code that is not in accordance with the NFS or CIFS protocol, then the NFS module 41 or the CIFS module 42 will invoke the API module 43 in an attempt to execute the operation or function. The API module 43 may also respond to remote procedure calls from network clients in accordance with other network protocols, such as the Simple Network Management Protocol (SNMP) or the Hypertext Transfer Protocol (HTTP).

The data processor 33 is programmed with a file system manager 44 for managing a hierarchical file system in the data storage 32. A suitable kind of file system is the UNIX file system, as described in Chapter 9, pp. 261-289 of Uresh Vahalia, Unix Internals: The New Frontiers, 1996, Prentice Hall, Inc., Simon & Schuster, Upper Valley River, N.J. 07458. The file system manager 44 is further described in Vahalia et al. U.S. Pat. No. 5,893,140 issued Apr. 6, 1999, entitled "File Server Having a File System Cache and Protocol for Truly Safe Asynchronous Writes," incorporated herein by reference.

The data processor 33 is also programmed with a volume layer 45 for organizing the data storage 32 into logical volumes of data blocks, and a Small Computer System Interface (SCSI) or Fibre Channel (FC) driver 46 for linking the volume layer 45 to the data storage 32.

The data processor 33 is also programmed with a file system based snapshot copy facility 47. The snapshot copy facility 47 permits the sharing of file system blocks between a production file and snapshot copies of the production file. The snapshot copy facility 47 is similar to the snapshot copy facility described in Bixby et al. U.S. Patent Application Publication 2005/0065986 published Mar. 24, 2005, incorporated herein by reference, except that the snapshot copy facility 47 uses delegated reference counts and virtual block mapping pointers instead of an ownership flag for maintaining block ownership information of the production files and snapshot copies, as will be further described below with reference to FIGS. 3 to 17.

The data processor 33 is also programmed with a file system based data de-duplication facility 48. The data de-duplication facility 48 permits a shared file system data block to be linked to more than one inode or indirect block of the same file or otherwise unrelated files. The data de-duplication facility 48 operates as described above to eliminate duplicate data blocks when a new file is migrated to the file server or when new data is written to an old file in the file server. If a block of a new file or a block of new data is found to contain the same data as a pre-existing data block in the data storage 32, then the block of the new file or the block of new data is replaced with the pre-existing data block by sharing the pre-existing data block with the new file or the old file, as will be further described below with reference to FIGS. 6 to 9.

As shown in the data storage 32 in FIG. 2, the file system is organized as a hierarchy. At the top of the hierarchy is a hierarchy of the directories 51 in the file system. Inodes of data files 52 depend from the file system directory hierarchy 51. Indirect blocks of data files 53 depend from the inodes of the data files. Data block metadata 54 and data blocks of data files 55 depend from the inodes of data files 52 and from the indirect blocks of data files 53. Specific examples of this hierarchy are further described below with reference to FIGS. 3 to 9.

The data storage 32 also stores a file system transaction log 56. For recovery of the file system upon re-boot of the file server, changes to the file system metadata in the data storage 32 are first written to the file system transaction log 56 before the changes are written to the file system in the data storage. Upon re-boot, the file system transaction log is inspected to find the last transaction recorded in the log, and then this last transaction is re-written to the file system in the data storage 32 to ensure that this last transaction has been completely written into the file system in the data storage.

The data storage 32 also stores a data de-duplication database 57 containing the logical block addresses and corresponding SHA-2 hash values for the data blocks in the single instance store. For example, the SHA-2 hash values are computed using the SHA-256 algorithm described in FIPS Publication 180-2 Secure Hash Standard, Aug. 1, 2002, 83 pages, National Institute of Standards and Technology, Gaithersburg, Md.

In order to determine whether or not the content of a new data block is already in the single instance store, the SHA-2 hash value is computed of the content of the new data block, and then the data de-duplication database 57 is searched for a data block having the same SHA-2 hash value. The content of the new data block is then compared to the content of any data blocks in the data de-duplication database 57 having the same SHA-2 value. If a match of the content is found, then the pointer to the new data block is replaced with a pointer to the matching block found in the data de-duplication database 57. Otherwise, the new data block is added to the data de-duplication database 57. Further, the data blocks can be encrypted as well using the standard encryption algorithms by maintaining data encryption key data base 59.

As introduced above, a file-system based snapshot copy facility needs a way of maintaining block ownership information for indicating whether or not each indirect block or data block of a production file or a snapshot copy of the production file is shared with another version of the production file. This block ownership information for a snapshot copy facility is maintained by storing respective reference counts for the file system indirect blocks and file system data blocks in the file system block hierarchy, and by storing respective delegated reference counts for the parent-child block relationships in the file system block hierarchy. For each parent-child block relationship, a comparison of the respective delegated reference count for the parent-child relationship to the reference count for the child block indicates whether or not the child block is either shared among parent blocks or has a single, exclusive parent block. For example, if the respective delegated reference count is equal to the respective reference count, then the child block is not shared, and the parent block is the exclusive parent of the child block. Otherwise, if the respective delegated reference count is not equal to the respective reference count, then the child block is shared among parent blocks. The method of using delegated reference counts for indicating whether a block is either exclusively owned or shared has the advantage of indicating block ownership in a way that is compatible between the snapshot copy facility and the use of reference counts by the data de-duplication facility, and that avoids the updating of reference counts in the metadata of child blocks when a shared indirect block is duplicated or "split" in order to perform a write to a data block depending from the shared indirect block in the file system block hierarchy.

But problem arises when these shared blocks needs to be relocated, compressed or encrypted. When a given data block is relocated to another logical block address or compressed into a different data block, this require changing the metadata of each and every data block that is shared between production file, snapshot copy facility and data de-duplication facility. In addition, there is no way of knowing if the given data block is compressed or encrypted.

In accordance with an aspect of the present invention, virtual block mapping pointer 58 is interposed between data blocks 55 and their parent inodes 52 or indirect blocks 53. The virtual block mapping 58 enables a migration or re-organization of the data blocks to be preformed in a non-disruptive fashion that is transparent to the file system manager, because the pointers to the logical data blocks can be changed dynamically without changing the block pointers in the inodes and indirect blocks. In addition, the back pointers permit the logical block pointers in the virtual blocks of metadata to be rapidly located given the corresponding logical block addresses.

For example, to move a data block from a specified source logical block address to a specified target logical address, the data stored at the specified source logical address is copied to the specified target logical address, and then the back pointer is accessed and used to locate the corresponding virtual block of metadata, and then the block pointer in the virtual block of metadata is changed to point to the specified target logical block address.

The virtual block 58 of metadata may also include attributes indicating whether or not the data in the file system data block has been compressed or encrypted. If the data in the file system data blocks may be compressed, then the virtual block of metadata may further include an attribute indicating the size of the data in the file system data block. For example, the size of a file system data block is 8 kilobytes, the compressed data is stored in a variable number of from one to sixteen contiguous disk blocks, each disk block has a size of 512 bytes, the pointer in the virtual block is the logical block address of the first disk block in the series, and the size attribute indicates the number of disk blocks in the series.

Figure 3:
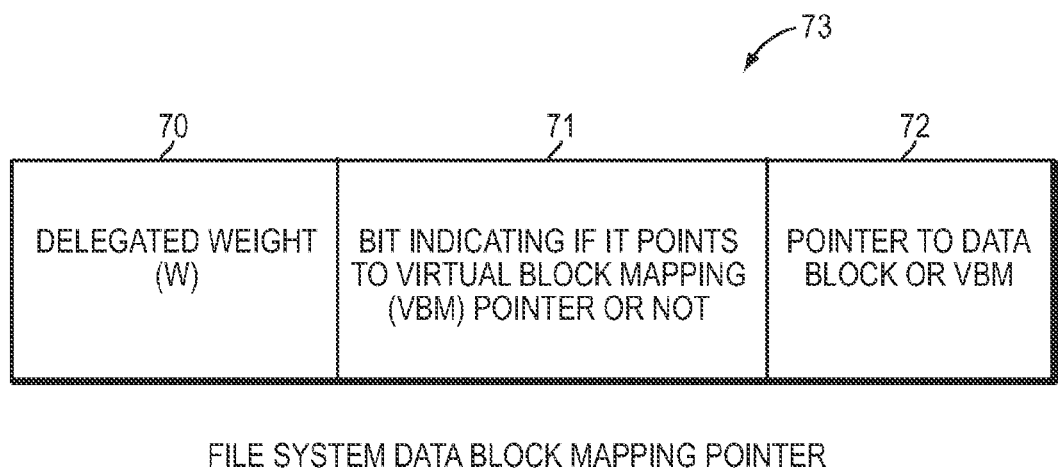
FIG. 3 is a block diagram of a file system block mapping pointer that is part of a metadata of an indirect block or a data block.

FIG. 3 shows a block diagram of a file system block mapping pointer 73 that is part of a metadata of an indirect block or a data block of a file. It includes fields such as delegated weight 70 for indicating exclusive ownership of file system blocks, bit flag 71 indicating if it points to data block, indirect block or a virtual block mapping pointer and pointer 72 to location of the virtual mapping block pointer if bit flag is set to point to a VBM or pointer 72 to location of the data block containing the data of the file or pointer 72 to indirect block of the file.

Figure 4:
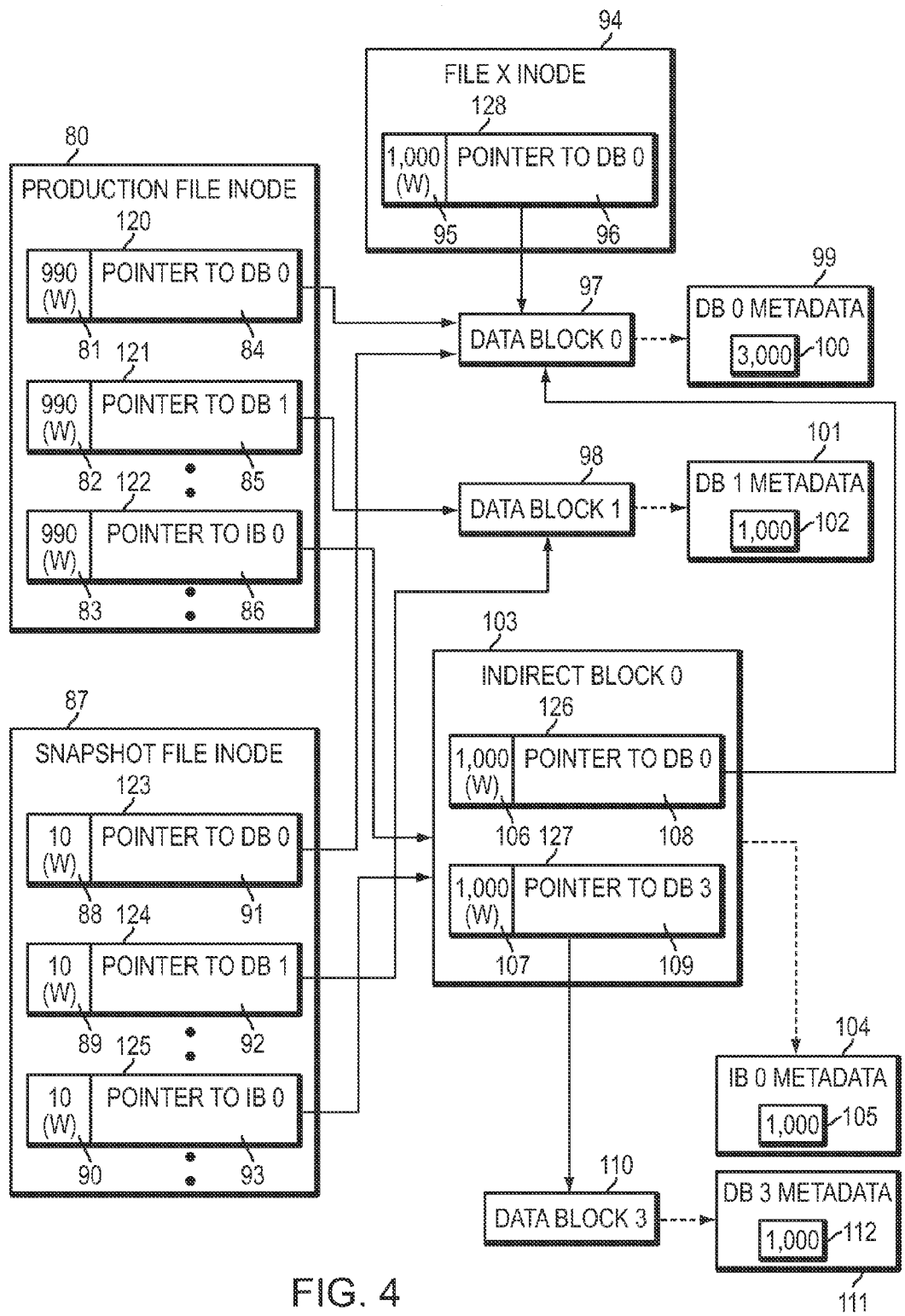
FIG. 4 is a block diagram of a production file using a delegated reference count in a file system block pointer field of a production file inode and a reference count in metadata of a data block to indicate the sharing of the file system blocks between snapshot copy of the production file and when a data de-duplication facility shares a block of production file with an otherwise unrelated file.

FIG. 4 shows a block diagram of a production file using a delegated reference count in a file system block pointer field of a production file inode 80 and a reference count in metadata of a data block to indicate the sharing of the file system blocks between snapshot copy of the production file and when a data de-duplication facility shares a block of production file with an otherwise unrelated file. The production file includes an indirect block 103 in addition to the production file inode 80 and at least two file system data blocks 97 and 98. A first block pointer field 120 in the production file inode 80 includes a delegated reference count 81 having an initial full-weight value of 1,000, and the block pointer field 120 also includes a pointer 84 to a first data block 97. The first data block 97 has metadata 99 including a reference count 100 also having a full-weight value of 1,000. A second block pointer field 121 in the production file inode 80 includes a delegated reference count 82 having an initial full-weight value of 1,000, and the block pointer field 121 also includes a pointer 85 to a second data block 98. The second data block 98 has metadata 101 including a reference count 102 also having an initial full-weight value of 1,000.

The production file inode 80 includes another block pointer field 122 including a reference count 83 having an initial full-weight value of 1,000, and the block pointer field 122 also includes a pointer 86 to an indirect block 103. The indirect block 103 has metadata 104 including a reference count 105 having a full-weight value of 1,000. The indirect block 103 has a first block pointer field 126 including a delegated reference count 106 having an initial full-weight value of 1,000, and the first block pointer field 126 also includes a pointer 108 to a third data block. The indirect block 103 has a second block pointer field 127 including a delegated reference count 107 having a full-weight value of 1,000, and the second block pointer field 127 also includes a pointer 109 to a data block 110. The data block 110 has metadata 111 including a reference count 112 having a full-weight value of 1,000.

When a snapshot copy is made of the production file, an inode 87 is allocated for the snapshot copy, and content of the production file inode 80 is copied into the snapshot copy inode 87, so that the child blocks 97, 98 and 103 of the production file inode 80 also become child blocks of the snapshot copy inode 87. Then the delegated reference counts 81, 82, 83 in the production file inode 80 are each decremented by a partial-weight value of 10, and the delegated reference counts 88, 89, 90 in the snapshot copy inode 87 are set to the partial-weight value of 10. The pointer to data blocks 91, 92 points to the data block 97, 98 of production file. Pointer to indirect block 93 in snapshot inode 87 points to the indirect block 103 of the production file inode. When data de-duplication facility is run on this block hierarchy and finds that the content of the data block pointed to by pointer 108 in indirect block 103 is the same as the content of the first data block 97, so that the data de-duplication facility changes the pointer 126 in the indirect block 103 to point to the first data block 97, and the reference count 100 in the metadata 99 is incremented by the value of the delegated reference count 106. The data de-duplication facility has also found that the content of a data block in an otherwise unrelated file named "File X" 94 is the same as the content of the first data block 97, so that the data de-duplication facility changes the pointer 128 in the File X inode 94 to point to the first data block 97, and increments the reference count 100 in the metadata 99 of the first data block 10973 by 1,000, the full-weight value in the delegated reference count 95 in the pointer field 128 in the File X inode 94.

Figure 5:
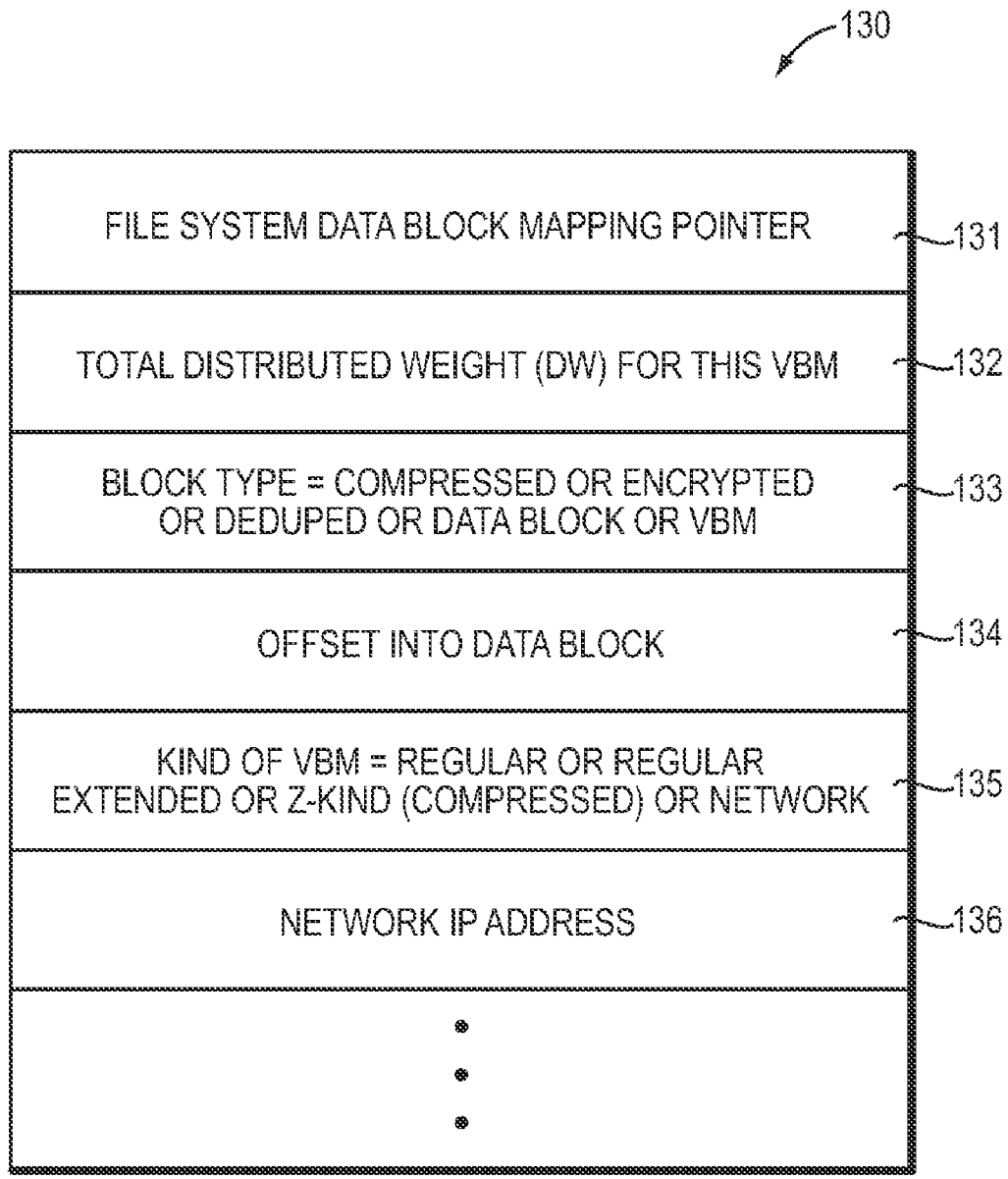
FIG. 5 is a block diagram of a virtual block mapping pointer that is used to share data block between production file, snapshot copy of the production file and de-duplicated data block.

FIG. 5 block diagram of a virtual block mapping pointer 130 that is used to indicate sharing of a data block between production file, snapshot copy of the production file and de-duplicated data block. This virtual block mapping (VBM) pointer is included in the file inode and includes various fields to store information about the shared file system data block. VBM includes file system data block mapping pointer 131 explained in FIG. 3. It also includes total distributed weight 132 for the VBM that is sum of weights of all data blocks that are represented by the VBM 130. It also includes block type 133 that indicates the type of data block that this VBM 130 points to. File system data block referenced by the VBM 130 can be a data block containing compressed data, encrypted data, de-duped data or it can point to another VBM when the file system data block is compressed to another physical data block. VBM 130 also includes offset into the data block 134. This field indicates the starting position of the data within a file system data block. VBM 130 also includes a kind of VBM field 135 that indicates the type of virtual block mapping pointer. VBM can be regular VBM when it points to a file system data block. It can be of type extended or Z-kind when it points to another VBM pointing to compressed data block. It can also point to a network data block. When VBM 130 points to a network data block, it also includes a field network IP address 136.

Figure 6:
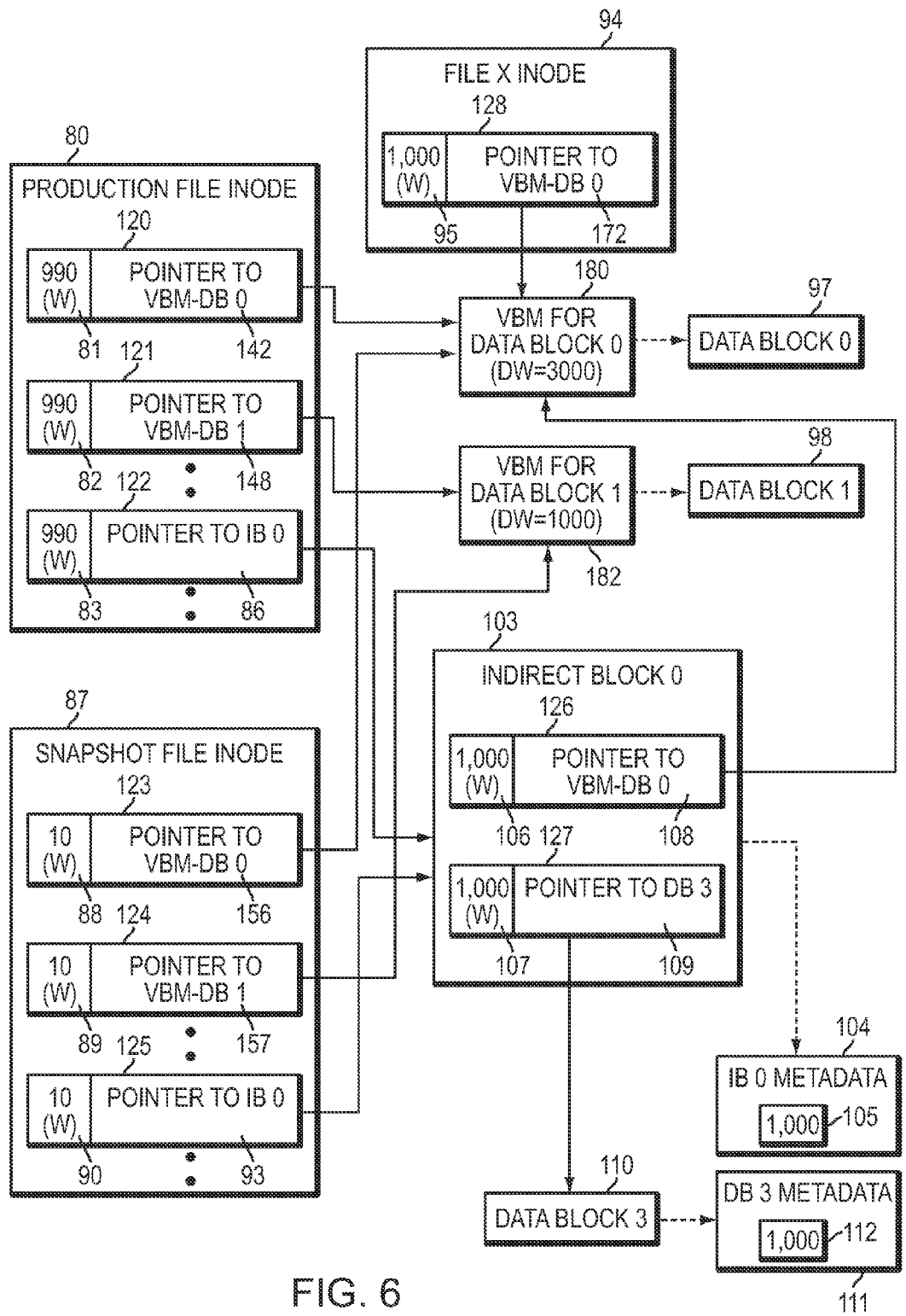
FIG. 6 is a block diagram of a production file using a delegated reference count and a virtual block mapping (VBM) pointer in a file system block pointer field of a production file inode to indicate the sharing of the file system blocks between snapshot copy of the production file and when a data de-duplication facility shares a block of production file with an otherwise unrelated file.

FIG. 6 shows a block diagram of a production file using a delegated reference count and a virtual block mapping (VBM) pointer in a file system block pointer field of a production file inode to indicate the sharing of the file system blocks between snapshot copy of the production file and when a data de-duplication facility shares a block of production file with an otherwise unrelated file. When data de-duplication facility is run on production file inode and snapshot copy is made, pointers in snapshot file inode and File X are adjusted to point to shared file system data block of the production file inode. According to the present invention, new virtual block mapping (VBM) block 180 is created for shared data block 97. Metadata 99 of the data block 97 is copied to the VBM 180 and its delegated weight is set to delegated reference count 100 in the metadata of data block 99. The block pointer field 120 of the production file inode 80 is changed to point to the virtual block mapping pointer 142 and block pointer instead of pointing to data block 97, it now points to newly created VBM 180 for data block 97. Similarly other two references to data block 97 are also changed. First block pointer 128 of file X inode 94 is changed to include a pointer 172 to VBM 180 for data block 97. Further block pointer 123 of snapshot file inode 87 is changed to include pointer 156 to VBM 180 for data block 97. Lastly, block pointer 126 of indirect block 103 is changed to include pointer 176 to VBM 180 for data block 97. Various Fields of the VBM 180 are changed to reflect the block type, kind of VBM etc. Similarly, for shared data block 98, new virtual block mapping (VBM) block 182 is created. Metadata 101 of the data block 98 is copied to the VBM 182 and its delegated weight is set to delegated reference count 102 in the metadata of data block 98. The block pointer field 121 of the production file inode 80 is changed to point to the virtual block mapping pointer 182 and block pointer 121 instead of pointing to data block 98, it now points to newly created VBM 182 for data block 98. Similarly second reference to data block 98 is also changed. Block pointer 124 of snapshot file inode 87 is changed to include pointer 157 to VBM 182 for data block 98. In the present invention by creating a VBM pointer, all references to shared block are now tracked using only one block and any changes that are required to reflect metadata changes for shared file system data block, only needs to be reflected in the VBM instead of all data block pointer or indirect block that point to the shared file system data block.

Figure 7:
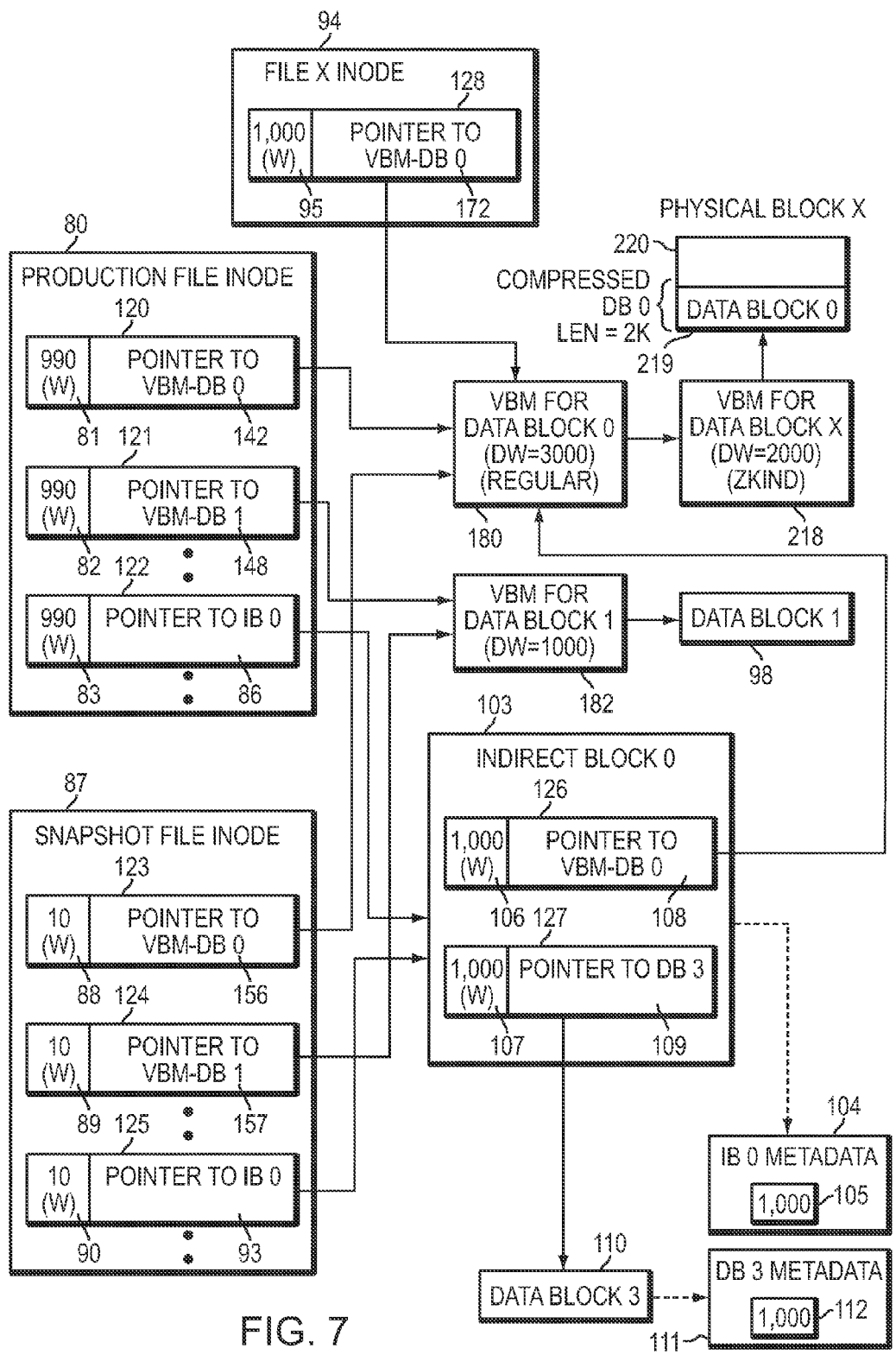
FIG. 7 is a block diagram of a production file using a delegated reference count and a virtual block mapping (VBM) pointer in a file system block pointer field of a production file inode to indicate the sharing of the file system blocks between snapshot copy of the production file and de-duplicated file system block with an otherwise unrelated file when compression facility compresses a file system data block into another physical data block.

FIG. 7 shows how file system data block hierarchy of FIG. 6 is changed when compression facility compresses a file system data block into another physical data block. For example, when data block 97 is compressed by data compression facility, new physical data block X 220 is allocated to store the compressed data. In this example, the data is compressed into 2K bytes. New virtual block mapping 218 block is created for physical data block 220 containing the compressed data 219. VBM 218 is of type Z-kind that indicates that it points to a compressed data block. Delegated weight of VBM 218 is set to the compressed length of the physical data block 220 which in this case is 2K. VBM 218 points to compressed data block 220. VBM 180 that originally pointed to data block 97 is now updated to point to the VBM 218 for compressed data block 220. Data block 97 is freed and returned to list of free data blocks. According to present invention, compressing a data block that is shared across snapshot copy and de-duplicated file now requires less intrusive metadata changes like allocating a new VBM and adjusting the pointer of VBM that points to the shared file system data block that is target of compression.

Figure 8:
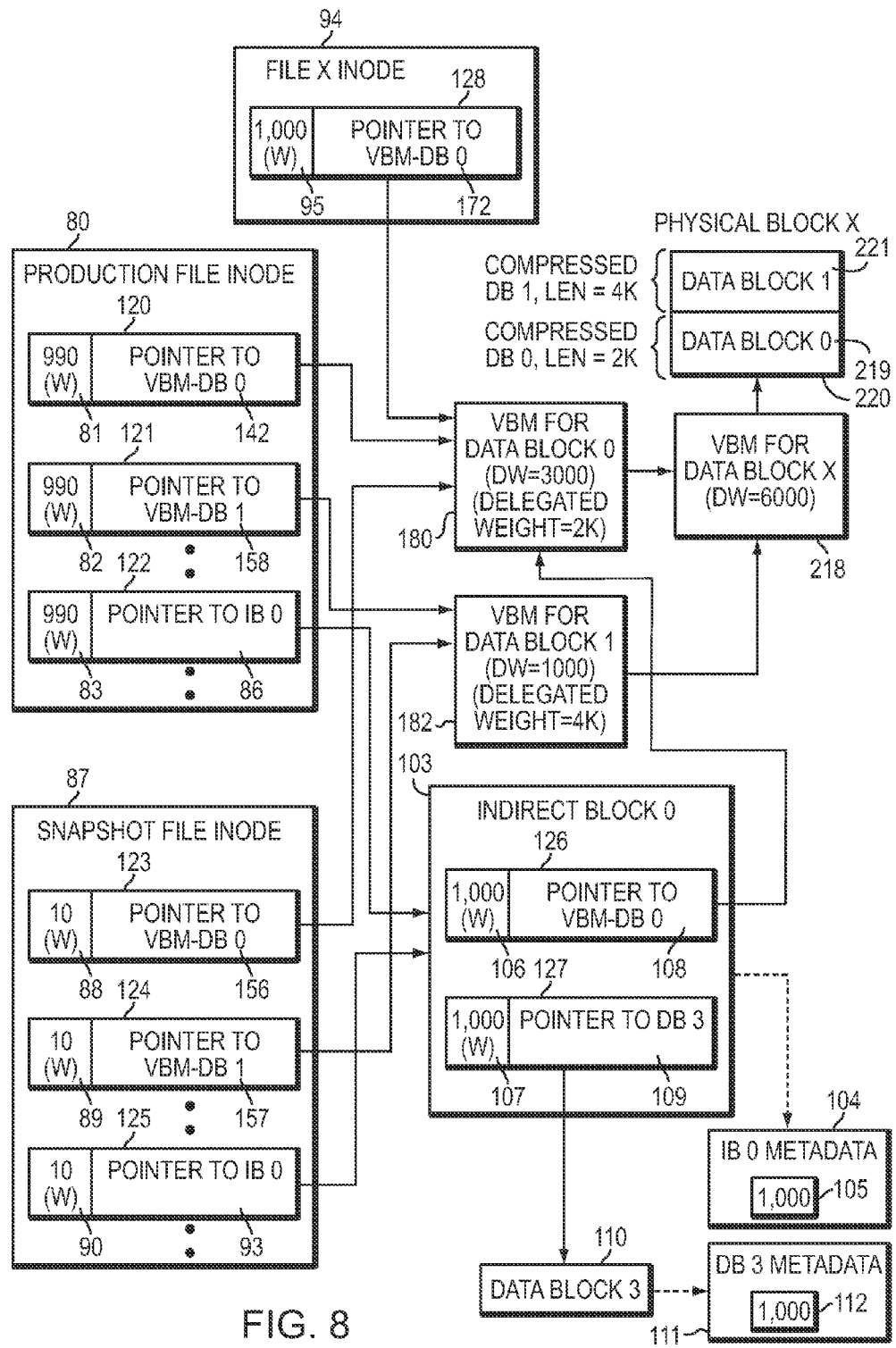
FIG. 8 is a block diagram of a production file using a delegated reference count and a virtual block mapping (VBM) pointer in a file system block pointer field of a production file inode to indicate the sharing of the file system blocks between snapshot copy of the production file and de-duplicated file system block with an otherwise unrelated file when compression facility compresses second file system data block into physical data block of FIG. 7 that has first compressed file system data block.

FIG. 8 shows how file system data block hierarchy of FIG. 7 is changed when compression facility compresses a second file system data block into physical data block that already includes a compressed data block. For example, when data block 98 is compressed by data compression facility into physical data block×220 to store the compressed data, the block 220 now includes compressed data from two file system data blocks 97 and 98. In this example, the data block 98 is compressed into 4K bytes and is stored at portion 221 of the physical data block 220. Virtual block mapping 218 is updated and its delegated weight is increased by the length of the compressed data of the data block 98 into physical data block 220 which in this case increases the delegated weight to 6K. VBM 182 that originally pointed to data block 98 is now updated to point to the VBM 218 that point to physical block 220 including the compressed data for data block 98. Data block 98 is freed and returned to list of free data blocks. Delegated weight of VBM 182 is set to the compressed length of the data that is 4K in this case.

Figure 9:
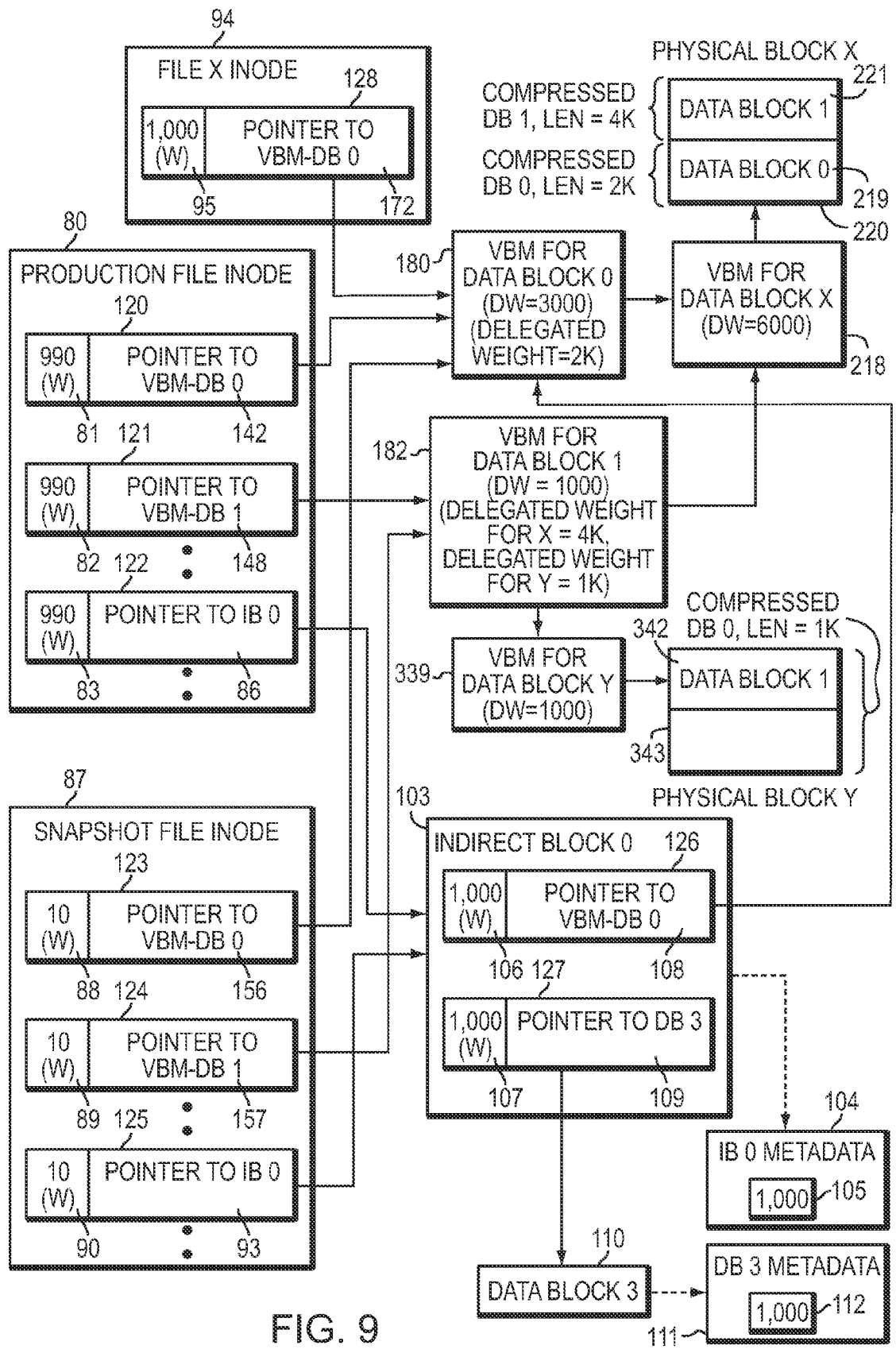
FIG. 9 is a block diagram of a production file using a delegated reference count and a virtual block mapping (VBM) pointer in a file system block pointer field of a production file inode to indicate the sharing of the file system blocks between snapshot copy of the production file and de-duplicated file system block with an otherwise unrelated file when compression facility compresses second file system data block into physical data block of FIG. 7 that has first compressed file system data block and second compressed data block doesn't fit completely and require another physical block to store part of its compressed data.

FIG. 9 shows how file system data block hierarchy of FIG. 7 is changed when compression facility compresses a second file system data block into physical data block that already includes a compressed data block and that second file system block doesn't fit completely into one data block after compression. For example, when data block 98 is compressed by data compression facility, the length of data after compression doesn't fit into physical data block X 220 to store complete compressed data. For instance in this case, the compressed length of data block 98 is 5K and physical data block 220 can only accommodate 4K and to store rest of 1K, new physical data block 342 is allocated. Data block 342 includes part of the compressed data of data block 98. For compressed data of data block 98, new virtual block mapping 339 block is allocated. VBM 339 is updated to point to the compressed data block 342. Virtual block mapping 218 is updated and its delegated weight is increased by the length of the compressed data of the data block 98 that is stored into physical data block 220 which in this case increases the delegated weight to 6K. VBM 182 that originally pointed to data block 98 is now updated to point to the VBM 218 and VBM 339 pointing to physical block 220 and physical block 342 respectively including the compressed data for data block 98. Data block 98 is freed and returned to list of free data blocks. Delegated weight of VBM 182 is set to the compressed length of the data that is 4K in this case. Metadata of VBM 339 is updated to reflect that it points to compressed data block and delegated weight and offset is set accordingly.

Further Operation Details

Reference will be made below to FIGS. 10-17 to describe a problem solved with the architecture described above with reference to FIGS. 1-9; however, a general overview is now given. The inventors have critically recognized that file where file system data blocks are shared within snapshot copies of file and de-duplicated files, compression is not. Further, a file that have shared blocks suffers from expensive metadata update operations when shared file system data block is relocated because it involves changing the metadata of each and every data block pointer that points to the shared block.

This problem is addressed with the architecture of the present invention by creating the virtual block mapping pointer that points to the shared file system data block. All the data pointers in the production file inode, snapshot file inode and de-duplicated file points to VBM instead of pointing to shared data block thus centralizing the metadata information for all shared blocks to just one block. The present invention thus allows efficient relocation of shared block, compression and encryption of shared blocks, decreases the I/O requirement and at the same time improves the efficiency and latency of the file server in a data network environment.

Figure 10:
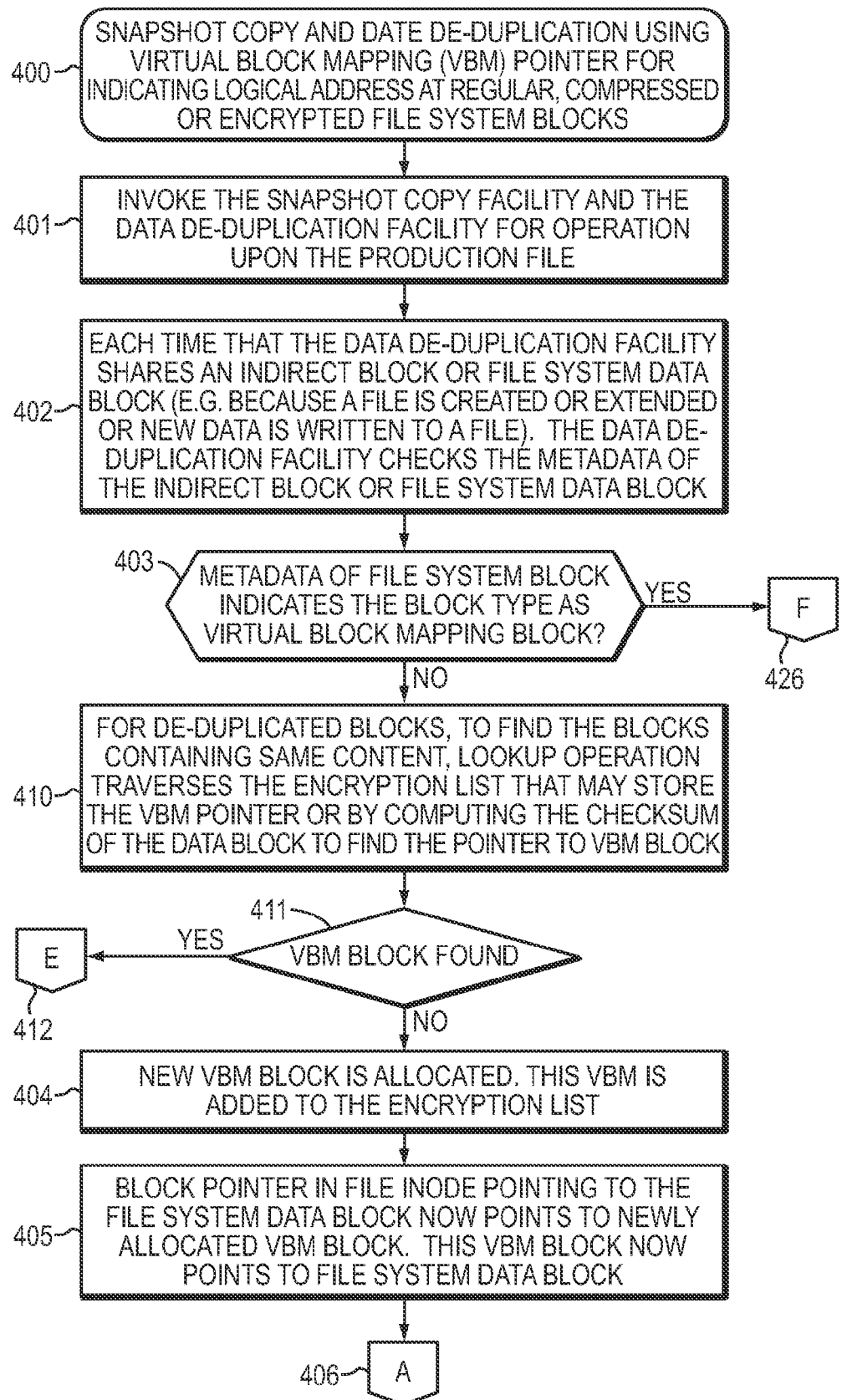
FIGS. 10 and 11 together comprise a flowchart showing a method by which the snapshot copy facility and the data de-duplication facility of FIG. 2 uses delegated weighted reference count and virtual block mapping (VBM) pointer for indicating sharing of file system data blocks.
Figure 11:
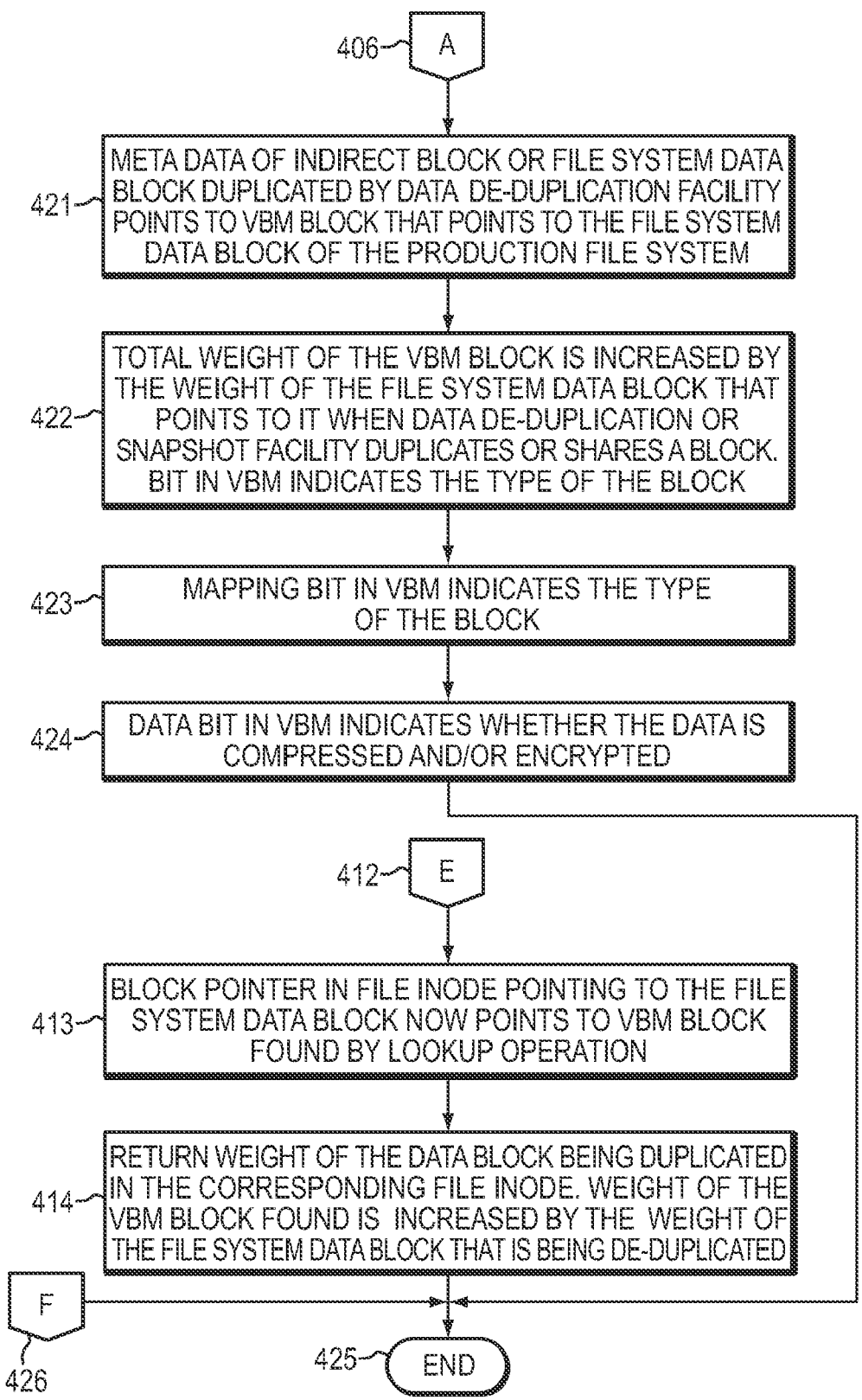
Figure 12:
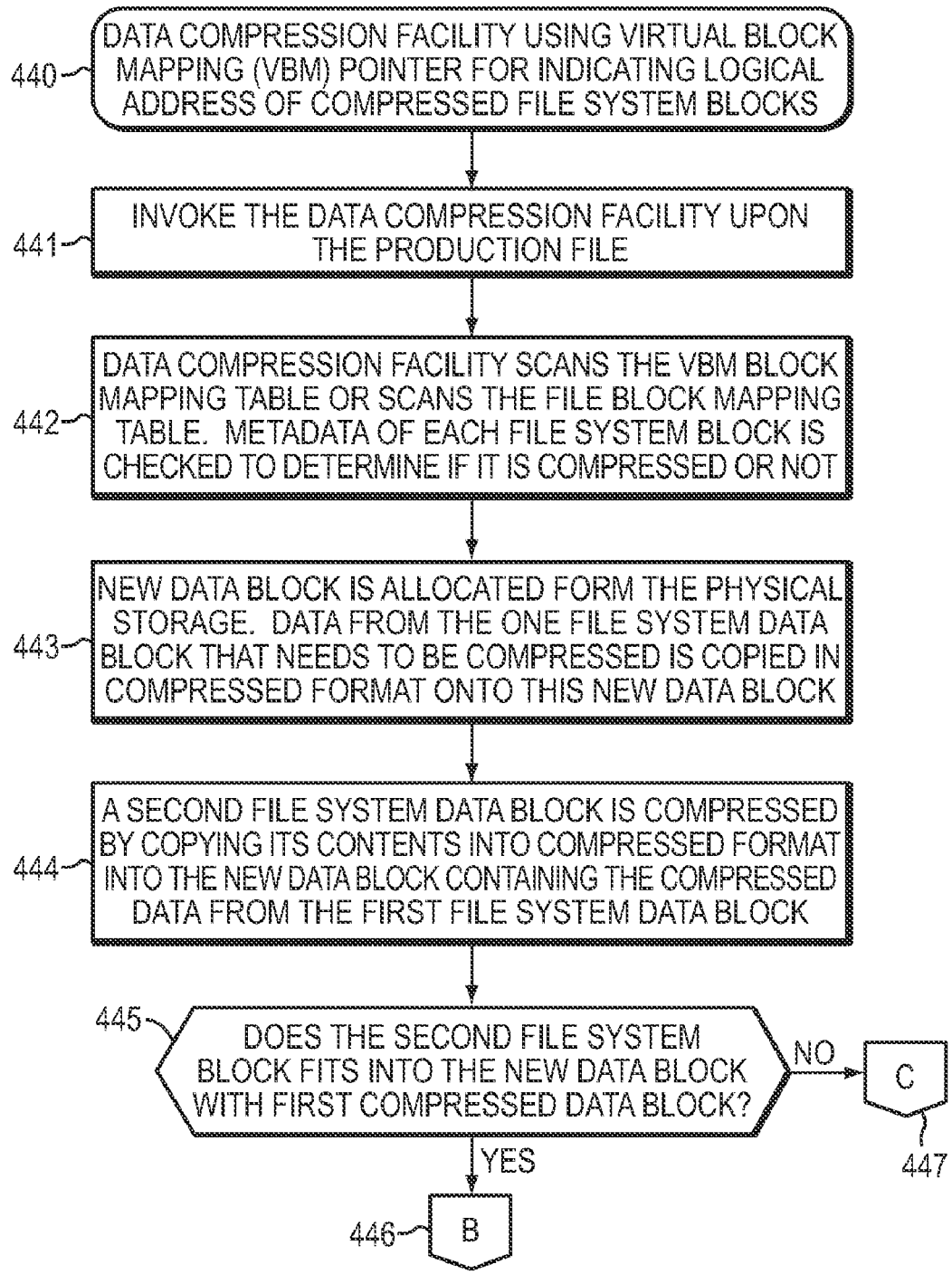
FIGS. 12 to 15 together comprise a flowchart showing a method by which the data compression facility of FIG. 2 uses virtual block mapping (VBM) pointer for indicating sharing of file system data blocks between production file, snapshot copy of the production file and de-duplicated file system data blocks.
Figure 13:
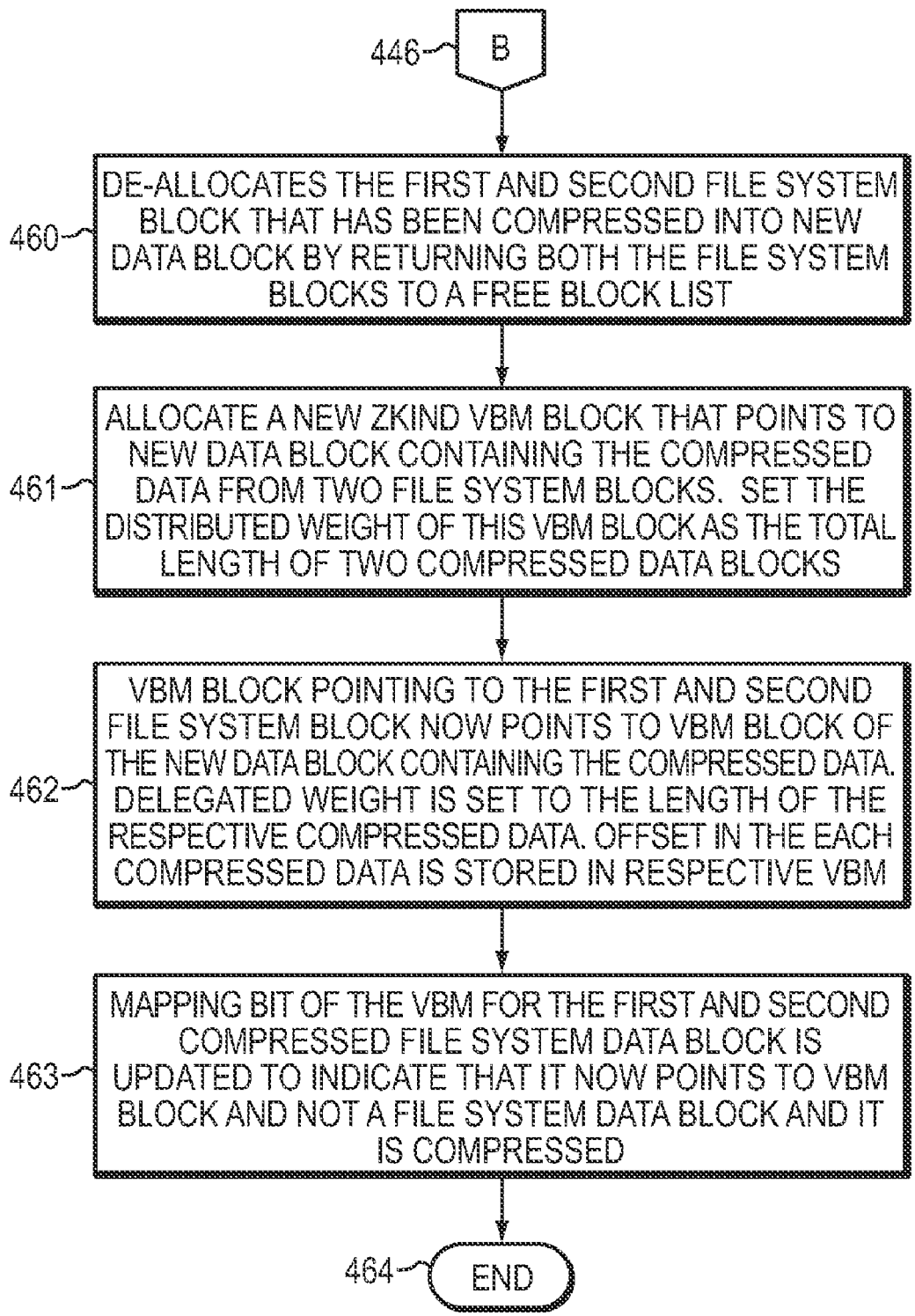
Figure 14:
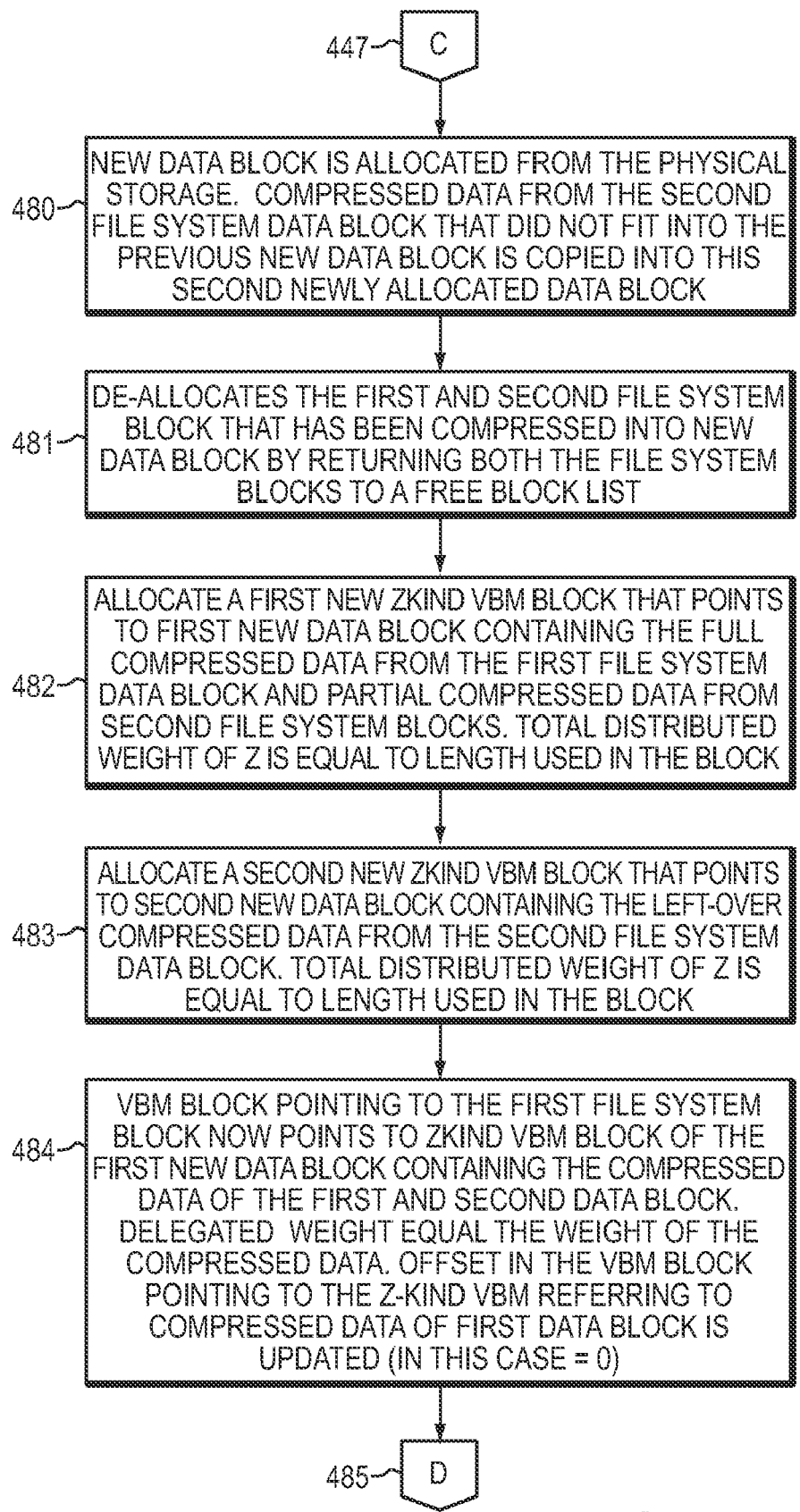
Figure 15:
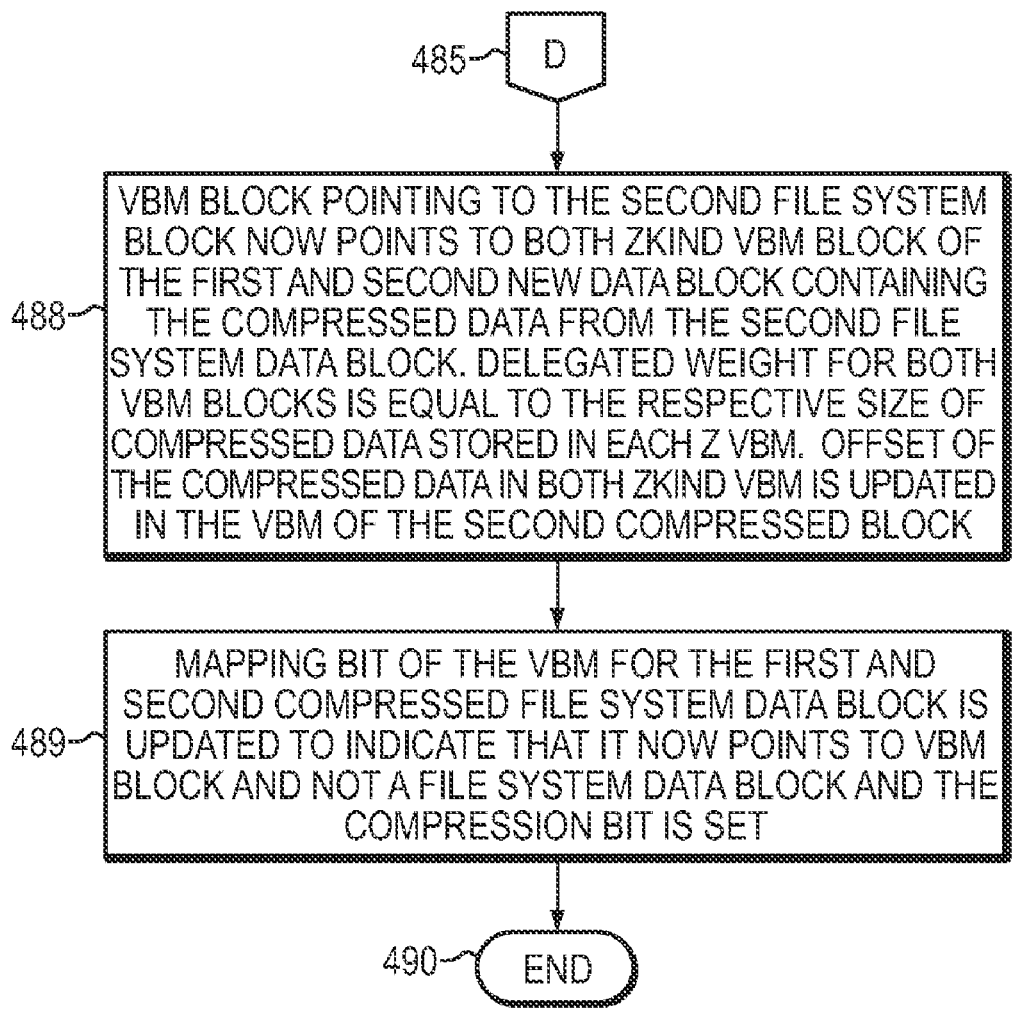

FIGS. 10 and 11 together shows a subroutine 400 for using virtual block mapping (VBM) pointer for indicating sharing of file system data blocks when snapshot copy facility and the data de-duplication facility is run on a production file. First snapshot copy facility and data de-duplication facility is invoked on a production file at step 401. In step 402, each time that the data de-duplication facility causes an indirect block or file system data block to become shared with another inode or indirect block, for example because a file is created or extended or new data is written to a file, the data de-duplication facility checks at step 403 if the metadata of the file system data block indicates that the block is of type VBM and refers to a virtual block mapping pointer. If this is the first time a file system data block is shared and thus no corresponding VBM exists, new virtual block mapping pointer is created at step 404. If at step 403, it's determined that metadata of file system data block indicates that the block type is of VBM, that means that the block is already de-duped and no more processing is required and thus de-duplication ends there. If at step 403, it's determined that the block is not a VBM, then method moves to next step 410, where attempt is made to find file system data block that contains the same content. In case of dc-duplicated blocks, to find the blocks containing same content, lookup operation traverses the encryption list that may store the VBM pointer or by computing the checksum of the data Block to find the pointer to VBM block. Next in step 411, check is made to determine if the lookup operation found the VBM pointer for the block containing the same content. If no VBM is found then in step 404, new virtual block mapping block is allocated and added to the encryption list and in step 405, block pointer in file inode pointing to the file system data block that is being de-duplicated now points to this newly allocated VBM block. Further, block pointer in the production file inode also points to this new allocated VBM block. Metadata of this VBM block is updated to point to the file System data block that was being de-duplicated and method proceed to step 406. In step 425, block pointer of file inode that points to shared data block is updated to point to VBM block that points to file system data block of production file system that is being shared. In step 422, total weight of the VBM block is increased by the weight of the file system data block that now points to VBM as a result of data de-duplication. Bit flag in the VBM is updated to indicate the type of VBM block. In step 423, mapping bit in VBM is updated to indicate type of file system block it points to. In step 424, data bit in the VBM is updated to indicate whether the data is compressed or encrypted or compressed and encrypted. Method ends at step 425 when all shared data blocks are updated to point to respective VBM pointers.

If at step 411, VBM is found, the method proceed to step 412, where in step 413 block pointer in file inode pointing to the file system data block that is being de-duplicated now points to VBM block found by lookup operation at step 410. In step 413, weight of the data block being duplicated is returned. In step 414, weight of the VBM block found is increased by the weight of the file system data block that is being de-duplicated. Process then ends at step 425.

FIGS. 12 to 15 together comprise a flowchart showing a method by which the data compression facility of FIG. 2 uses virtual block mapping (VBM) pointer for indicating sharing of file system data blocks between production file, snapshot copy of the production file and de-duplicated file system data blocks starting at step 440. In step 441, data compression facility is invoked on a production file. In step 442, data compression facility then scans the VBM block mapping table or file block mapping table that includes the information regarding all the data blocks of a given file. Metadata of each file system block is checked to determine if it is compressed or not. Blocks that are already compressed are skipped. In step 443, blocks that are not compressed, are then compressed using the method described by the present invention. New physical data block is allocated from the physical storage. Data from the file system block that is being compressed is copied in compressed format onto the newly allocated data block. In step 444, next file system block is checked for compression and the compressed data from this second file system data block is copied onto the physical data block containing the compressed data from first file system data block. In step 445, size of compressed data is checked to find out if second data block can fit into physical data block allocated at step 443 in compressed format. If yes, the method proceeds to step 446. In step 460, first and second file system data block is de-allocated after the data from these blocks are copied in compressed format to another physical block. The data block is returned to the free list for further use by the file system. In step 461, new VBM block of type Z-kind is allocated that points to new physical data block containing the compressed data form two file system data blocks. Distributed weight of the VBM block is set to total length of two compressed data blocks. In step 462, VBM block that originally pointed to first and second file system data block now points to this newly allocated VBM of Z-kind. Delegated weight of both the VBM is set to length of the respective compressed data. Offset of each VBM is set to indicate the compressed data stored in the physical data block. In step 463, mapping bit of the VBM for the first and second data block is updated to indicate that it now points to VBM block of Z-kind (compressed) and data it refers to is in compressed format. Process is repeated for all the file system data blocks that need to be compressed and ends at step 464.

If compressed data from second file system data block can not fit into physical data block along with the compressed data from the first file system block, method proceeds at step 446. In step 480, new physical data block is allocated from the physical storage to store the compressed data from second file system data block. Part of compressed data of second file system data block is stored in first physical data block along with the compressed data from first data block and rest of the compressed data is stored in the physical data block newly allocated at step 480. In step 481, first and second file system data block is de-allocated after the data from these blocks are copied in compressed format to another physical block. The data block is returned to the free list for further use by the file system. In step 482, first VBM block of Z-kind is allocated that points to first new physical data block containing the compressed data of first file system data block and partial compressed data from second file system data block. Distributed weight of this VBM is set to the compressed length of the block. In step 483, second VBM block of Z-kind is allocated that points to partial compressed data from second file system data block that did not fit into first physical data block. Distributed weight of this VBM is set to the compressed length of the block. In step 484, mapping pointer in the VBM block that points to first file system data block is updated to point to Z-kind VBM allocated at step 482 that points to compressed data from first and second file system data block. Delegated weight of the VBM is set to weight of the compressed data. Offset of this VBM is further updated. In step 488, mapping pointer in the VBM block that points to second file system data block is updated to point to two Z-kind VBM allocated at step 482 and 483 that points to compressed data from first and second file system data block. Delegated weight of the VBM is set to respective size of compressed data stored in each Z-kind VBM. Offset of this VBM is further updated. In step 489, mapping bit of the VBM for the first and second compressed file system data block is updated to indicate that it now points to VBM block and data it refers to is in compressed format. Process is repeated for all the file system data blocks that need to be compressed and ends at step 490.

Figure 16:
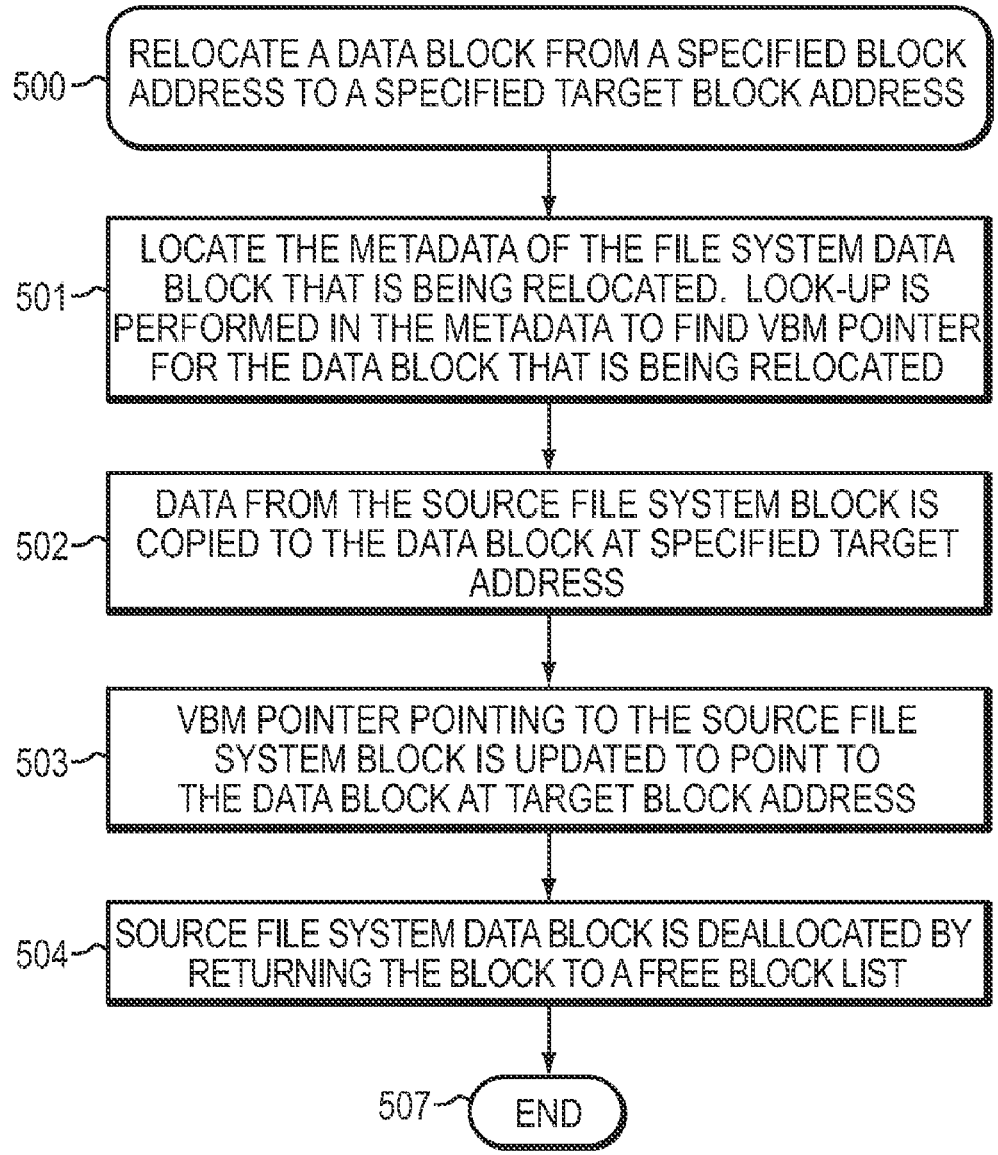
FIG. 16 is a flowchart showing a method by which file system data blocks are relocated using virtual block mapping (VBM) pointer when data blocks are shared between production file, snapshot copy of the production file and de-duplicated file system data blocks.

FIG. 16 is a flowchart showing a method starting at step 500 by which file system data blocks are relocated using virtual block mapping (VBM) pointer when data blocks are shared between production file, snapshot copy of the production file and de-duplicated file system data blocks. In step 501, metadata of the file system data block that is being relocated is located. Look-up is performed in the metadata to find VBM pointer for the data block that is being relocated. In step 502, data from the file system data block is copied to the target block address for relocation. In step 503, VBM pointer found by lookup operation is updated to point to new data block at target block address that now has a copy of the data. In step 504, file system block after it's copied and VBM is adjusted is now deallocated by returning the data block to the free block list. The process is repeated for all the file system data blocks that need to be relocated and ends at step 505.

Figure 17:
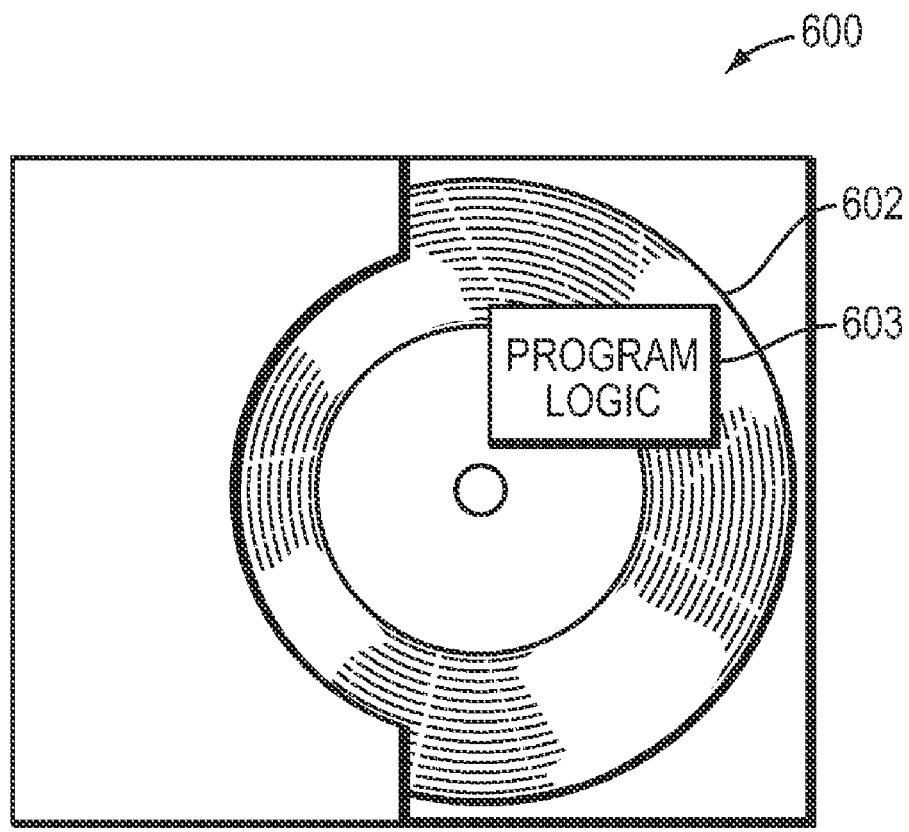
FIG. 17 shows a storage application for carrying out the methodology described herein and a computer medium including software described herein.

FIG. 17 shows the storage application 600 and Computer-readable medium 602 that includes program logic 603. Such a medium may be represented by any or all of those described at the beginning of this Detailed Description.

What is claimed is:

1. A method of operating a storage server in a data network for relocating one or more data blocks of a file, the file including multiple data blocks containing data of the file, and the file further being organized as a hierarchy of file system blocks including inodes, indirect blocks, and one or more data blocks, the file stored in a data storage including a production file having a first data block in the hierarchy of file system blocks, the first data block being a child of the production file inode in the hierarchy of file system blocks, the method comprising the steps of:

creating a virtual block mapping pointer in response to a request by a client of the storage server to de-duplicate the file system data block or to create a snapshot copy of the production file, wherein the virtual block mapping pointer provides a mapping information to a logical block storing data of the file system block of the production file, wherein metadata of the file system data block includes a pointer pointing back to the metadata of the virtual block mapping pointer; and relocating one or more file system data blocks from one part of the file system address space to another by using the virtual block mapping pointer providing the mapping information for the one or more file system data blocks containing compressed, encrypted or de-duplicated data; wherein the metadata of the virtual block mapping pointer includes a total distributed weight, wherein the total distributed weight indicates the total reference count of all the file system data blocks that points to the virtual block mapping pointer.

2. The method of claim 1, wherein the storage server is represented by a file server, wherein the file server presents a logical view of a file to a client of the file server, wherein the data of the file can be compressed or encrypted.

3. The method of claim 1, wherein the metadata of the virtual block mapping pointer includes a total distributed weight, wherein the total distributed weight indicates the total reference count of all the file system data blocks that points to the virtual block mapping pointer.

4. The method of claim 1, wherein the metadata of the virtual block mapping pointer further includes a mapping bit wherein the mapping bit indicates whether the virtual block mapping pointer points to another virtual block mapping pointer or a file system data block.

5. The method of claim 1, wherein the metadata of the virtual block mapping pointer further includes a data bit wherein the data bit indicates whether the data stored on the file system data block is compressed or encrypted.

6. The method of claim 1, wherein the metadata of the virtual block mapping pointer further includes a network IP address of a host machine, wherein the host machine stores the file system data block that is referenced by the virtual block mapping pointer.

7. The method of claim 1, wherein the metadata of the virtual block mapping pointer further includes a block type field wherein the block type indicates whether the virtual block mapping pointer is a regular virtual block mapping pointer, a compressed virtual block mapping pointer, a regular extended virtual block mapping pointer or a network virtual block mapping pointer.

8. The method of claim 1, wherein creating a virtual block mapping pointer comprises the steps of:

allocating a virtual block mapping pointer;

changing the mapping information of a de-duplicated file system data block to point to the virtual block mapping pointer;

incrementing the total distributed weight of the virtual block mapping pointer by the weight of the file system data block that points to the virtual block mapping pointer;

changing the mapping bit of the virtual block mapping pointer to indicate the type of the block;

changing the data bit of the virtual block mapping pointer to indicate if the data is compressed or encrypted; and changing the metadata of the virtual block mapping pointer to include the mapping information to the file system block of the production file.

9. The method of claim 1, wherein de-duplication of a file system data block further comprises the steps of:

checking whether metadata of the file system data block indicates the block type as a virtual block mapping pointer and upon finding that the metadata of the file system data block does not point to a virtual block mapping pointer, performing the look-up operation to find the virtual block mapping pointer;

creating a new virtual block mapping block upon not finding the virtual block mapping pointer during the look-up operation and adding the virtual block mapping block to an encryption list, wherein, metadata of the file system data block is updated to point to the new virtual block mapping block; and upon finding the virtual block mapping pointer during the look-up operation, updating the metadata of the file system data block to point to the virtual block mapping pointer and updating the metadata of the virtual block mapping pointer to point to the file system data block being de-duplicated.

10. A method of claim 1, wherein relocating one or more file system data block comprises the steps of:

locating the metadata of the one or more file system data block that is being relocated to find a pointer referring back to the virtual block mapping pointer providing mapping information to the file system data block that is being relocated;

copying the content of the file system data block from a source logical address to a target block address;

changing the metadata of the virtual block mapping pointer to point to the file system data block at the target block address; and freeing the file system data block at the source address.

11. The system of claim 1, wherein the metadata of the virtual block mapping pointer further includes a mapping bit wherein the mapping bit indicates whether the virtual block mapping pointer points to another virtual block mapping pointer or a file system data block.

12. The system of claim 1, wherein the metadata of the virtual block mapping pointer further includes a data bit wherein the data bit indicates whether the data stored on the file system data block is compressed or encrypted.

13. The system of claim 1, wherein the metadata of the virtual block mapping pointer further includes a block type field wherein the block type indicates whether the virtual block mapping pointer is a regular virtual block mapping pointer, a compressed virtual block mapping pointer, a regular extended virtual block mapping pointer or a network virtual block mapping pointer.

14. A method of operating a storage server in a data network for read or write access to data of a file, the file including multiple data blocks containing data of the file, and the file further being organized as a hierarchy of file system blocks including inodes, indirect blocks, and data blocks, the file stored in a data storage including a production file having a first data block in the hierarchy of file system blocks, the first data block being a child of the production file inode in the hierarchy of file system blocks, the method comprising the steps of:
creating a first virtual block mapping pointer in response to a request by a client of the storage server to de-duplicate the file system data block or to create a snapshot copy of the production file, wherein the first virtual block mapping pointer provides a mapping information to a logical block storing data of the file system block of the production file, wherein metadata of the file system data block includes a pointer pointing back to the metadata of the first virtual block mapping pointer; and
compressing one or more file system data block into one or more physical data block by creating a second virtual block mapping pointer wherein the second virtual block mapping pointer provides the mapping information to the physical data block storing compressed data of the file system block of the production file and first virtual block mapping pointer provides the mapping information to the second virtual block mapping pointer, wherein metadata of the physical data block includes a pointer pointing back to the metadata of the second virtual block mapping pointer; wherein the metadata of the virtual block mapping pointer includes a total distributed weight, wherein the total distributed weight indicates the total reference count of all the file system data blocks that points to the virtual block mapping pointer.

15. The method of claim 14, wherein the storage server is represented by a file server, wherein the file server presents a logical view of a file to a client of the file server, wherein the data of the file can be compressed or encrypted.

16. The method of claim 14, wherein the metadata of the virtual block mapping pointer further includes a mapping bit wherein the mapping bit indicates whether the virtual block mapping pointer points to another virtual block mapping pointer or a file system data block.

17. The method of claim 14, wherein the metadata of the virtual block mapping pointer further includes a data bit wherein the data bit indicates whether the data stored on the file system data block is compressed or encrypted.

18. The method of claim 14, wherein the metadata of the virtual block mapping pointer further includes a network IP address of a host machine, wherein the host machine stores the file system data block that is referenced by the virtual block mapping pointer.

19. The method of claim 14, wherein the metadata of the virtual block mapping pointer further includes a block type field wherein the block type indicates whether the virtual block mapping pointer is a regular virtual block mapping pointer, a compressed virtual block mapping pointer, a regular extended virtual block mapping pointer or a network virtual block mapping pointer.

20. The method of claim 14, wherein creating a virtual block mapping pointer comprises the steps of:
allocating a virtual block mapping pointer;
changing the mapping information of a de-duplicated file system data block to point to the virtual block mapping pointer;
incrementing the total distributed weight of the virtual block mapping pointer by the weight of the file system data block that points to the virtual block mapping pointer;
changing the mapping bit of the virtual block mapping pointer to indicate the type of the block;
changing the data bit of the virtual block mapping pointer to indicate if the data is compressed or encrypted; and
changing the metadata of the virtual block mapping pointer to include the mapping information to the file system block of the production file.

21. The method of claim 14, wherein de-duplication of a file system data block further comprises the steps of:
checking whether metadata of the file system data block indicates the block type as a virtual block mapping pointer and upon finding that the metadata of the file system data block does not point to a virtual block mapping pointer, performing the look-up operation to find the virtual block mapping pointer;
creating a new virtual block mapping block upon not finding the virtual block mapping pointer during the look-up operation and adding the virtual block mapping pointer to an encryption list, wherein, metadata of the file system data block is updated to point to the new virtual block mapping block; and
upon finding the virtual block mapping pointer during the look-up operation, updating the metadata of the file system data block to point to the virtual block mapping pointer and updating the metadata of the virtual block mapping pointer to point to the file system data block being de-duplicated.

22. A system for accessing a data of a file in a data storage environment, the system comprising:
a data storage storing files, wherein the files stored on the data storage includes a production file having a first data block in the hierarchy of file system blocks, the first data block being a child of the production file inode in the hierarchy of file system blocks;
a storage server, wherein the storage server access the files stored on the data storage, wherein the file includes multiple data blocks containing data of the file, and the file further being organized as a hierarchy of file system blocks including inodes, indirect blocks, and data blocks; and
a program logic in communication with the data storage and the storage server for carrying out the steps of:
creating a first virtual block mapping pointer in response to a request by a client of the storage server to de-duplicate the file system data block or to create a snapshot copy of the production file, wherein the first virtual block mapping pointer provides a mapping information to a logical block storing data of the file system block of the production file, wherein metadata of the file system data block includes a pointer pointing back to the metadata of the first virtual block mapping pointer;
relocating one or more file system data blocks from one part of the file system address space to another by using the virtual block mapping pointer providing the mapping information for the one or more file system data blocks containing compressed, encrypted or de-duplicated data; and
compressing one or more file system data block into one or more physical data block by creating a second virtual block mapping pointer wherein the second virtual block mapping pointer provides the mapping information to the physical data block storing compressed data of the file system block of the production file and first virtual block mapping pointer provides the mapping information to the second virtual block mapping pointer, wherein metadata of the physical data block includes a pointer pointing back to the metadata of the second virtual block mapping pointer; wherein the metadata of the virtual block mapping pointer includes a total distributed weight, wherein the total distributed weight indicates the total reference count of all the file system data blocks that points to the virtual block mapping pointer.

23. A program product for accessing data of a file, the program product operating in a data storage environment that includes a data storage system in communication with a storage server providing logical disk storage to the storage server for storing files that includes multiple data blocks containing data of the files, and the file further being organized as a hierarchy of file system blocks including inodes, indirect blocks, and data blocks, wherein the program product includes computer-executable logic encoded on a computer-readable medium for executing the following steps:

creating a first virtual block mapping pointer in response to a request by a client of the storage server to de-duplicate the file system data block or to create a snapshot copy of the production file, wherein the first virtual block mapping pointer provides a mapping information to a logical block storing data of the file system block of the production file, wherein metadata of the file system data block includes a pointer pointing back to the metadata of the first virtual block mapping pointer;

relocating one or more file system data blocks from one part of the file system address space to another by using the virtual block mapping pointer providing the mapping information for the one or more file system data blocks containing compressed, encrypted or de-duplicated data; and compressing one or more file system data block into one or more physical data block by creating a second virtual block mapping pointer wherein the second virtual block mapping pointer provides the mapping information to the physical data block storing compressed data of the file system block of the production file and first virtual block mapping pointer provides the mapping information to the second virtual block mapping pointer, wherein metadata of the physical data block includes a pointer pointing back to the metadata of the second virtual block mapping pointer; wherein the metadata of the virtual block mapping pointer includes a total distributed weight, wherein the total distributed weight indicates the total reference count of all the file system data blocks that points to the virtual block mapping pointer.

* * * * *